United States Patent
Miyasaka

(10) Patent No.: US 7,663,678 B2
(45) Date of Patent: Feb. 16, 2010

(54) GAMMA CORRECTION, IMAGE PROCESSING METHOD AND PROGRAM, GAMMA CORRECTION CIRCUIT, IMAGE PROCESSING APPARATUS, AND DISPLAY APPARATUS

(75) Inventor: Daigo Miyasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 878 days.

(21) Appl. No.: 11/232,926

(22) Filed: Sep. 23, 2005

(65) Prior Publication Data

US 2006/0066546 A1 Mar. 30, 2006

(30) Foreign Application Priority Data

Sep. 30, 2004 (JP) .............................. 2004-286502
Jun. 1, 2005 (JP) .............................. 2005-161554

(51) Int. Cl.
*H04N 5/202* (2006.01)
(52) U.S. Cl. .................................. 348/254
(58) Field of Classification Search ................ 348/254, 348/255, 256; 345/88
See application file for complete search history.

(56) References Cited

U.S. PATENT DOCUMENTS

| 2,903,506 | A | * | 9/1959 | Livingston | .................. 348/234 |
|---|---|---|---|---|---|
| 6,751,362 | B2 | * | 6/2004 | Slavin | .................. 382/299 |
| 6,941,031 | B2 | * | 9/2005 | Slavin | .................. 382/299 |
| 7,382,416 | B2 | * | 6/2008 | Mizusaki | .................. 348/674 |
| 2002/0008762 | A1 | * | 1/2002 | Takemoto | .................. 348/223 |
| 2002/0021360 | A1 | * | 2/2002 | Takemoto | .................. 348/222 |
| 2004/0130638 | A1 | * | 7/2004 | Sakamoto | .................. 348/254 |
| 2004/0252240 | A1 | * | 12/2004 | Mizusaki | .................. 348/674 |

FOREIGN PATENT DOCUMENTS

JP 2610095 2/1997
JP 10-126648 5/1998

OTHER PUBLICATIONS

Refer to p. 3 of Specification.

* cited by examiner

*Primary Examiner*—Jason Chan
*Assistant Examiner*—Nicholas G Giles
(74) *Attorney, Agent, or Firm*—Young & Thompson

(57) ABSTRACT

A gamma correction method including an inverse gamma correction process for inputting a value of a tone input signal Tin of X bits having non-linear tone-luminance characteristic and for outputting a tone signal Tout of Y bits (X<Y) having the tone-luminance characteristic converted to the linear characteristic, and a format conversion process for inputting the Tout and for outputting the tone output signal of (N+M) bits formed of a set of Tn and Tm which is nearest to the Tout when the Tout is expressed as $A^{Tn} \times Tm$ with a constant A, an index number indicated by the signal Tn of N bits and a mantissa indicated by the signal Tm of M bits.

19 Claims, 19 Drawing Sheets

Fig. 5

|  |  | M=5 | | M=6 | |
|---|---|---|---|---|---|
| Tin | Tout | Tn | Tm | Tn | Tm |
| 0 | 0 | 0 | 0 | 0 | 0 |
| 1 | 1 | 0 | 1 | 0 | 1 |
| 2 | 2 | 0 | 2 | 0 | 2 |
| 3 | 4 | 0 | 4 | 0 | 4 |
| ⋮ | ⋮ | ⋮ | ⋮ | ⋮ | ⋮ |
| 47 | 520 | 5 | 16 | 4 | 32 |
| 48 | 546 | 5 | 17 | 4 | 34 |
| 49 | 571 | 5 | 17 | 4 | 35 |
| 50 | 598 | 5 | 18 | 4 | 37 |
| ⋮ | ⋮ | ⋮ | ⋮ | ⋮ | ⋮ |

|  | | VALUES OF INDEX NUMBER PART | | | | |
|---|---|---|---|---|---|---|
|  | | 0 | 1 | 2 | 3 | 4 |
| VALUES OF MANTISSA PART | 0 | 0 | 0 | 0 | 0 | 0 |
| | 1 | 1 | 2 | 3 | 5 | 8 |
| | ⋮ | ⋮ | ⋮ | ⋮ | ⋮ | ⋮ |
| | 31 | 12 | 17 | 24 | 34 | 46 |
| | 32 | 12 | 18 | 25 | 34 | 47 |
| | 33 | 13 | 18 | 25 | 35 | 47 |
| | ⋮ | ⋮ | ⋮ | ⋮ | ⋮ | ⋮ |
| | 63 | 17 | 24 | 34 | 46 | 63 |

GAMMA CORRECTION, IMAGE PROCESSING METHOD AND PROGRAM, GAMMA CORRECTION CIRCUIT, IMAGE PROCESSING APPARATUS, AND DISPLAY APPARATUS

BACKGROUND OF THE INVENTION

1. Field of the Invention

The present invention relates to a gamma correction method, program and apparatus, an image processing method using the same, and a display apparatus.

2. Description of the Related Art

Various display apparatus such as a CRT (Cathode Ray Tube), a liquid crystal display (LCD), and a plasma display panel (PDP) have inherent gamma characteristics and chromaticity characteristics particular to each type of display.

The gamma characteristic of a display is a relationship between an input signal level and an output luminance of the display apparatus. On the other hand, the chromaticity characteristic indicates a chromaticity of three or more primary colors (for example, RGB+white) of respective displays. Since three primary colors RGB are generally used in a display, the chromaticity characteristic generally indicates the chromaticity of RGB.

These characteristics depends on the type of the display apparatus and therefore the gamma characteristics are different to a large extent and the chromaticity characteristics are also different in the respective systems of the CRT, LCD and PDP.

On the other hand, an input image signal such as a television signal and sRGB has a gamma characteristic (relationship between signal level and luminance indicated thereby) and chromaticity characteristic that are determined by predetermined specifications. Accordingly, the gamma correction process and color space conversion process are implemented for matching between the gamma characteristic and chromaticity characteristic with the video signal and display apparatus.

Television signals are usually subjected to gamma correction and chromaticity conversion matched with the gamma characteristic of a CRT, considering display to CRT. Therefore, in most television receivers using CRTs, a special gamma correction process on the CRT side has not been required. However, for display of television signals on an LCD or PDP, at least gamma correction in the general sense (process for converting the gamma characteristic of the video signal into the gamma characteristic of display apparatus) must be conducted to maintain high image quality. The gamma characteristic differs more than the color characteristic. Since difference in the gamma characteristic relates to generation of false contour and conversion in color taste of the intermediate tone, remarkable deterioration in image quality will be generated unless matching is attained by implementing gamma correction in the general sense.

The gamma correction in the general sense is assumed here as a series of processes required for matching between the gamma characteristics of the video signal and display apparatus using the "gamma correction (in the narrower sense)" for converting the linear tone-luminance characteristic to non-linear characteristic and the "inverse gamma correction" for converting the non-linear tone-luminance characteristic to linear characteristic. Thereafter, the gamma correction of narrower sense is expressed as the "positive gamma correction", while the gamma correction in the general sense is expressed in direct as "gamma correction" in this specification.

Moreover, in order to accurately reproduce images and pictures generated conforming to the specifications of sRGB (in other words, to realize corresponding color reproduction), the color space conversion process is also required after the inverse gamma correction. In more practical, the matrix operation of 3×3 is required for the input RGB signal as disclosed in "Color Image Reproduction" (pp. 33 to 39, formula 3.11) by Tajima (reference 3).

However, in the case where the inverse gamma correction process is performed with digital process, the number of output bits must be larger than the number of input bits in order to keep the accuracy thereof. If the number of output bits is insufficient, deterioration in image quality (for example, false contour) is generated due to quantization error.

On the other hand, when the number of output bits increases, circuit scale of the inverse gamma correction circuit and the operation circuit provided in the subsequent stage becomes large in accordance with the number of bits, resulting in the problem that manufacturing cost of display apparatus becomes high.

Moreover, for corresponding color reproduction, the color space conversion is required after completion of the inverse gamma correction. In this case, the circuit scale of the color space conversion circuit also increases when the output bits generated at the time of inverse gamma correction increases.

As the related art for solving the problem that the number of bits increases, JP 10-126648 (reference 1) discloses "Input Signal Level Application Type Gamma Correction Circuit in Liquid Crystal Display Apparatus". The reference 1 relates to a gamma correction circuit which does not generate deterioration of image quality in the conversion process using a less number of bits.

The input signal level application type gamma correction circuit in the liquid crystal display apparatus described in the reference 1 has a structure comprising an AD converter and a DA converter respectively before and after the digital gamma correction circuit and additionally comprising variable gain control amplifiers before the AD converter and after the DA converter.

The amplifying degrees of these variable gain control amplifiers are in the complementary relationship. The reference 1 well improves the tone characteristic of dark area by changing an amplifying degree in accordance with level of analog input signal. Accordingly, high precision gamma correction has been realized without increase in the number of bits.

As the other related art, an example of using a floating point to indicate the tone signal of a display apparatus is described, for example, in U.S. Pat. No. 5,528,741 (reference 2).

However, the reference 1 is based on the fact that an input signal is the analog signal. Therefore, a DA converter is further required when an input signal is the digital signal, as much complicating the circuit. The television signal (HDTV or the like) and the image signal (sRGB) are almost inputted as the digital signals and the image signal process is often conducted in digital. Therefore, it is preferable to employ a digital inverse gamma correction process circuit which can realize inverse gamma correction with sufficient accuracy without use of an AD converter and a DA converter.

The reference 2 discloses a method for effectively converting a pixel value of floating point representation into an integer value of one byte. In application of computer graphics, it is more convenient to use the floating point representation in the computation process of pixel value. However, since almost all display apparatuses process the pixel data (pixel value) used for pixel display as integers, display is impossible if the pixel data of the floating point representation is not converted to the integer representation.

Accordingly, in the reference 2, the data of floating point representation is converted to the integer representation. Moreover, the gamma correction is also conducted simultaneously at the time of conversion into the integer representation. However, this structure has realized the simplified gamma correction process but yet includes an unsolved problem that the number of bits increases after the gamma correction. Accordingly, higher accuracy and reduction in the scale of the circuits in the subsequent stage cannot be realized in the case where some arithmetic operations are executed after the gamma correction.

SUMMARY OF THE INVENTION

The present invention has been proposed considering the problems explained above and therefore an object of the present invention is to provide a gamma correction circuit for realizing matching between the gamma characteristic of digital input signal and the gamma characteristic of display apparatus, a gamma correction method for executing the gamma correction process or inverse gamma correction process with sufficient accuracy while the scale of the operation circuit it self and the circuits provided in the subsequent stage thereof is controlled, and also provide a program and an apparatus, an image processing method using the same, a program and an apparatus, and a display apparatus.

In view of achieving the object explained above, the present invention provides, as a first profile, a gamma correction method comprising an inverse gamma correction process for inputting a value of a tone input signal Tin of X bits having non-linear tone-luminance characteristic and for outputting a tone signal Tout of Y bits (X<Y) having the tone-luminance characteristic converted to the linear characteristic, and a format conversion process for inputting the Tout and for outputting the tone output signal of (N+M) bits formed of a set of Tn and Tm which is nearest to the Tout when the Tout is expressed as A^Tn×Tm with a constant A, an index number indicated by the signal Tn of N bits and a mantissa indicated by the signal Tm of Mbits, wherein a value of the constant A is a natural number power of 2, the M satisfies the relationship of M≦Y−N, the minimum value of the N is 2 when A is 2 and 1 when A is larger than 2, and the maximum value of the N which is determined on the basis of the constant A and the M is the maximum value resulting in that a set of the values of Tn and Tm becomes a set of different values for all values of Tin.

According to the present invention, it is possible to provide a gamma correction circuit for realizing matching between the gamma characteristic of digital input signal and the gamma characteristic of display apparatus, a gamma correction method for executing the gamma correction process or inverse gamma correction process with sufficient accuracy while the scale of the operation circuit it self and the circuits provided in the subsequent stage thereof is controlled and also provide a program and an apparatus, an image processing method using the same, a program and an apparatus, and a display apparatus.

BRIEF DESCRIPTION OF THE DRAWINGS

FIG. 5 is an input-output table for explaining the method for obtaining the adequate M, N values from the input-output table of the inverse gamma correction process in the gamma correction method.

DETAILED DESCRIPTION OF PREFERRED EMBODIMENTS

Figure 1A:
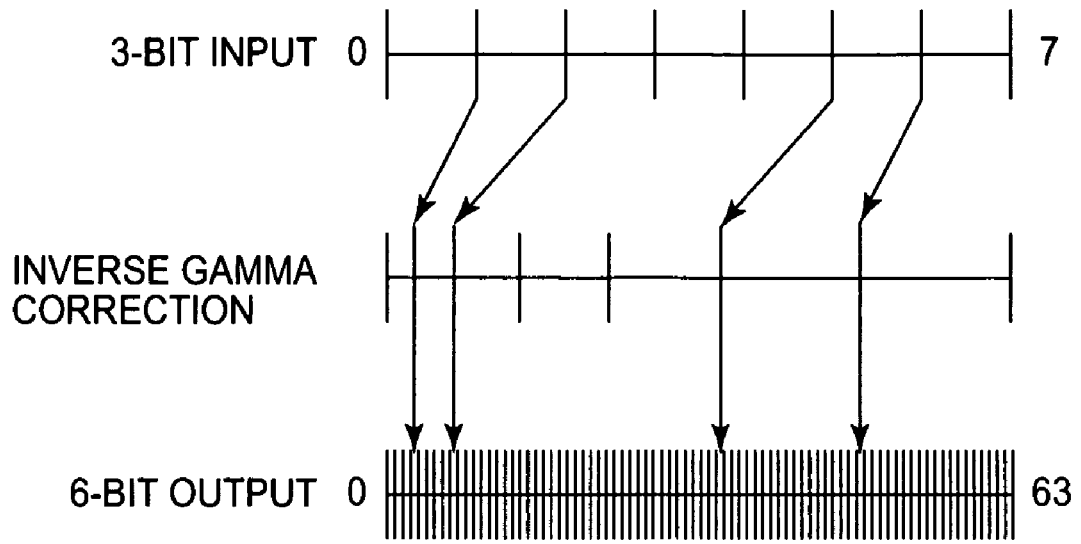
FIGS. 1A and 1B are diagrams illustrating a relationship between signal values before and after the inverse gamma correction and assigned tones using numeral lines.

Standard image signals such as sRGB, scRGB, and television image signal are generally subjected to gamma correction. A tone value of the image signal having been subjected to the positive gamma correction has a non-linear characteristic for luminance:

(TONE VALUE)=(LUMINANCE)^(1/γ)

For corresponding color reproduction, the 3×3 matrix operation is necessary as explained above. However, the image including a large amount of complementary color such as cyan, magenta and yellow and intermediate tone generates change in the hue when the matrix operation is executed in direct to the signal having completed the positive gamma correction.

Accordingly, inverse gamma correction must be implemented to provide the linear tone value for luminance before execution of the matrix operation.

However, the circuit scale for matrix operation in the subsequent stage becomes large because the number of input bits is set larger than the number of output bits for the digital inverse gamma correction.

As explained above, increase in the number of bits required for the inverse gamma correction results in the cause allowing increase in the circuit scale to realize corresponding color reproduction.

Therefore, in the present invention, tone accuracy after the inverse gamma correction process must be acquired while controlling increase in the circuit scale by expressing a tone value of the image signal with the method different from that in the related art. In more practical, a tone value is expressed with the method on the basis of the floating point representation.

Definition of tone expression by this method will now be explained. In the conventional method, 8-bit tone is expressed as the tones from 0 to 255 using binary numbers of eight (8) digits. On the other hand, the present method expresses the tone in the shape of 2^Tn×Tm like the floating point representation. Here, Tn is a number called an index number in the floating point representation, while Tm, a number called a mantissa in the floating point representation.

A difference from the ordinary floating point representation is that it is not necessary to add "1" to the bits one digit higher than the most significant bit of the mantissa. In the case of the ordinary floating point representation, it is determined to add "1" to the bit one digit higher than the most significant bit of the mantissa in order to make it impossible to express the identical value with a combination of Tn and Tm (2^1× 38=2^2×19).

However, in the present method, direct expression is employed, in which "1" is not added to the bit one digit higher than the most significant bit of the mantissa. However, the most significant bit is set to "1" so far as it is possible.

For example, in the case of 2^2×19, since the most significant bit of the mantissa (19: decimal number=010011: binary number) is "0", it is expressed as 2^1×38 so that the most significant bit becomes "1". Moreover, 2^0×19 is expressed as it is because the most significant bit of the mantissa is 0 but there is no index number which is smaller than 0.

For example, in the case where tone is expressed as 2^Tn×Tm, it is possible to obtain 0=2^0×0≦2^Tn×Tm≦2^3×63=0.504 and to express the values from 0 to 504 with eight (8) bits when the definition domain of Tn is set to 0 to 3 (2 bits), while the definition domain of Tm to 0 to 63 (6 bits).

Employment of such tone expression method is particularly effective for operation of raised power such as inverse gamma correction. Moreover, the circuit scale for 3×3 matrix operation and positive gamma correction can be reduced by introducing the tone after the inverse gamma correction based on the floating point representation.

Figure 1B:
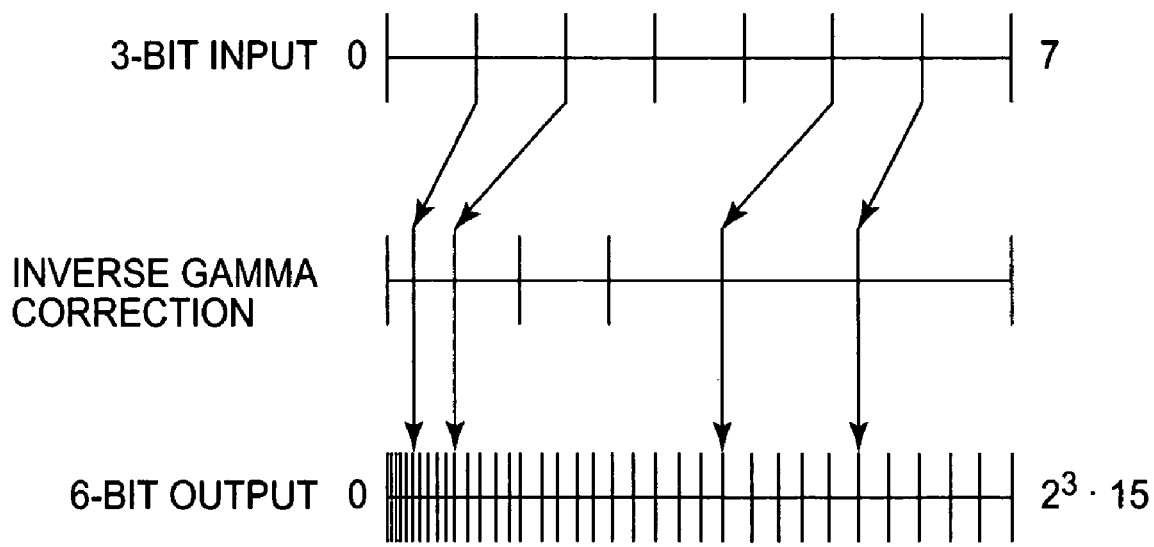

Superiority in tone expression with method based on floating point representation:

Superiority in tone expression in the present method will be explained. In the inverse gamma correction, the method based on the floating point representation can more effectively assign the tone with higher accuracy than the ordinary tone expression method. FIGS. 1A and 1B illustrate a relationship between signal values before and after the inverse gamma correction and assigned tones using numeral lines. In order to simplify the explanation, an input is assumed as three (3) bits, while an output as six (6) bits (index number is two (2) bits and mantissa is four (4) bits in the method based on the floating point representation). Gamma value is 2.2 which is generally used.

When the inverse gamma correction is executed, an input value is converted to a value which is smaller than that before correction. As illustrated with the numeral lines in the intermediate stage, the value after the inverse gamma correction is assigned to one of the tones both in the existing representation and floating point representation. In the numeral lines of the lowest stage, the numerals which may be expressed with the methods based on the existing representation of six (6) bits and the floating point representation of six (6) bits are indicated with the vertical lines.

In the case of the existing representation, the number of numerals, which can be expressed, existing between the numerals to which the input value after inverse gamma correction has been assigned becomes smaller as it goes to the darker tone side. This fact suggests that quantization error is easily generated when the tone is dark and operation accuracy of the matrix operation to be conducted in the subsequent stage becomes lower.

On the other hand, in the present method, the number of numerals, to be expressed, existing among the numerals to which an input value after the inverse gamma correction has been assigned is almost identical without relation to darkness of the tone. This fact suggests that quantization error becomes smaller and operation accuracy of matrix operation to be conducted in the subsequent stage becomes higher.

In more practical, when a value of Q is equal to or larger than one (1) in the operation of (output)=(input)^Q like the inverse gamma correction, the operation accuracy of the method based on the floating point representation becomes higher.

Moreover, since visual characteristic of man shows the linear characteristic for lightness which is equal to ⅓ power of luminance from the formula for obtaining L* of the L*a*b*color display system (CIE 1976), it is required to enhance accuracy of dark tone at the time of conducting the inverse gamma correction. In other words, since quantization error appears in direct as difference in color, such color difference can also be reduced by lowering quantization error of dark tone in the floating point representation than that in the existing representation.

As explained above, it can be understood that the present method is more preferable, also from the viewpoint of the visual characteristic, in the completed expression because color difference becomes smaller.

It is also possible to make smaller the circuit scale by reducing the index number and mantissa to two (2) bits and three (3) bits which are respectively reduced by one bit in accordance with the required operation accuracy.

The reference 2 introduced in the background art discloses the method of gamma correction by converting the pixel value of the floating point representation into an integer value of one byte. As explained above, the gamma correction process itself in which the input is given by a value of the floating point representation to output an integer certain exists. However, the input data of the floating point representation in the reference 2 is generated with operation in the field of computer graphics and it is not assumed that the data of integer value obtained with an ordinary digital camera and a scanner or the like is processed after conversion for the floating point representation. The present invention is characterized in the conversion method for converting a value of the integer representation into the value in the method based on the floating point representation. Accordingly, the reference 2 cannot realize "higher accuracy in the operation circuit and reduction in the circuit scale in the subsequent stage" which is the object of the present invention.

Superiority of the method based on the floating point representation has been explained above. However, the effect of the present invention cannot always be obtained by introducing the structure explained above. Namely, it is required to adequately set the ranges of the values A, Tn, and Tm in the expression method of A^Tn×Tm on the basis of an input-output table for the actual inverse gamma correction. The effect of the present invention cannot be attained with the desired values of A, Tn and Tm in the floating point representation explained in the reference 2.

The setting method for such values will be explained below.

Figure 2:
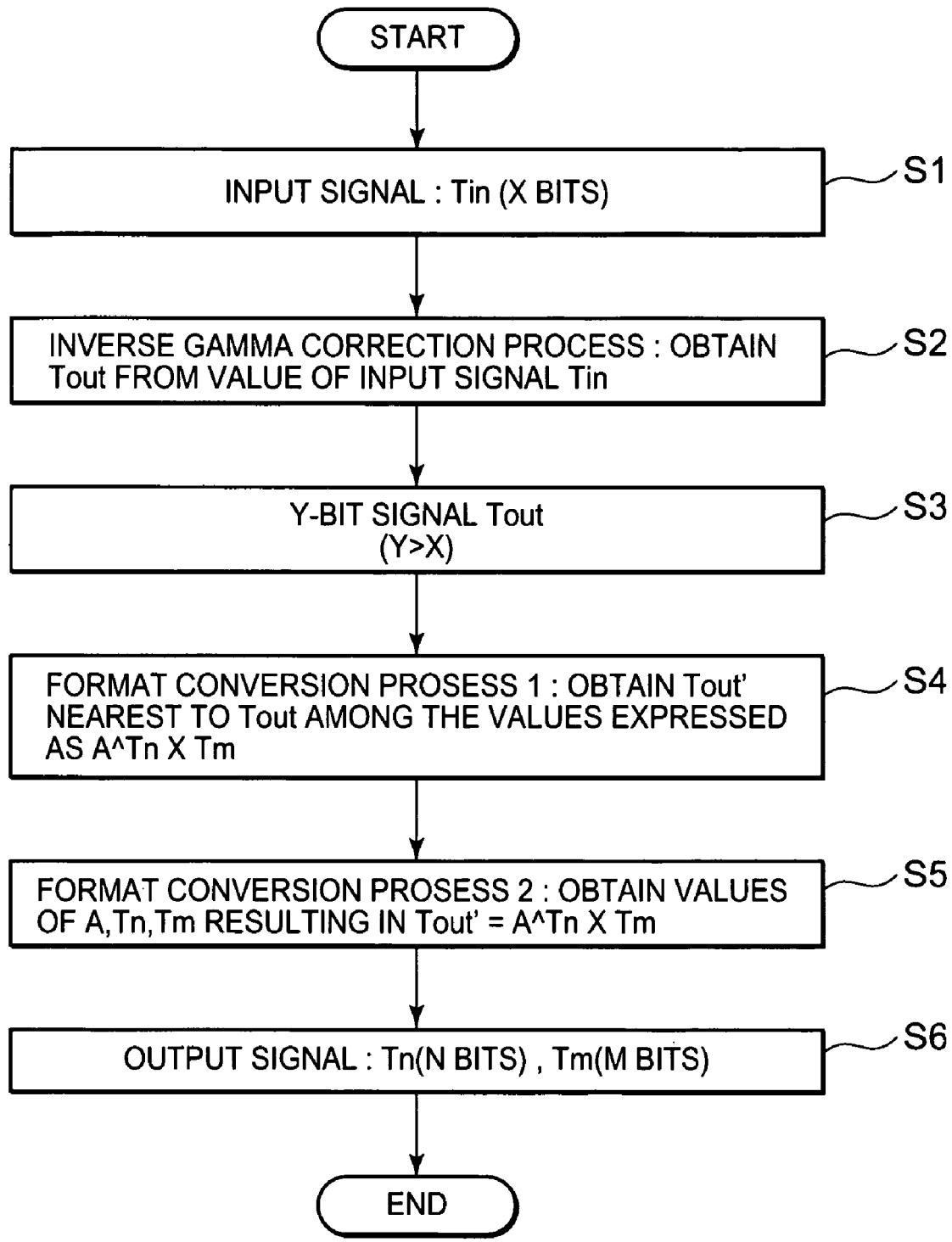
FIG. 2 is a diagram for explaining the process of the gamma correction method to which the present invention is adapted.

FIG. 2 illustrates flow of the inverse gamma correction method to which the present invention is adapted. This inverse gamma correction method uses a signal of X bits as the input signal, while a signal of N+M bits as the output signal.

This inverse gamma correction method includes an inverse gamma correction process inputting a value of the tone input signal Tin of X bits and outputting the tone signal Tout of Y bits (X<Y), a format conversion process for inputting the tone signal Tout of Y bits and outputting Tn and Tm which become nearest to the Tout when the tone signal Tout is expressed as A^Tn×Tm with a constant A, an index number Tn of N bits and a mantissa Tm of M bits, and a process for generating the output signal consisting of the Tn of N bits and the Tm of M bits.

In this inverse gamma correction method, the tone input signal Tin of X bits is inputted (step S1). The tone input signal is subjected to the inverse gamma correction (step S2). Here, in the inverse gamma correction process, Tin which the tone-luminance characteristic is non-linear is converted to linear and is then outputted as Tout.

Here, since the tone input signal Tin is transmitted conforming to the standards, for example, of sRGB, it is enough to obtain the Tout for converting the tone-luminance characteristic of Tin into the linear characteristic based on such standards. The inverse gamma correction process is assumed to be executed with the structure in which a conversion table like a usual LUT of input value Tin and output value Tout is stored in a memory. In summary, the inverse gamma correction process is executed to convert the non-linear characteristic of Tin into the linear characteristic.

In the signal Tout of Y bits obtained by the inverse gamma correction process, Y is usually larger than X (step S3). The reason is that in the inverse gamma correction process, accuracy will be lowered if the number of output bits does not larger than the number of input bits, as explained above.

Thereafter, the Tout signal is converted in the format conversion process (steps S4, S5). In the format conversion process, a value of the Tout is converted to the signal Tn of N bits and the signal Tm of M bits.

Figure 3:
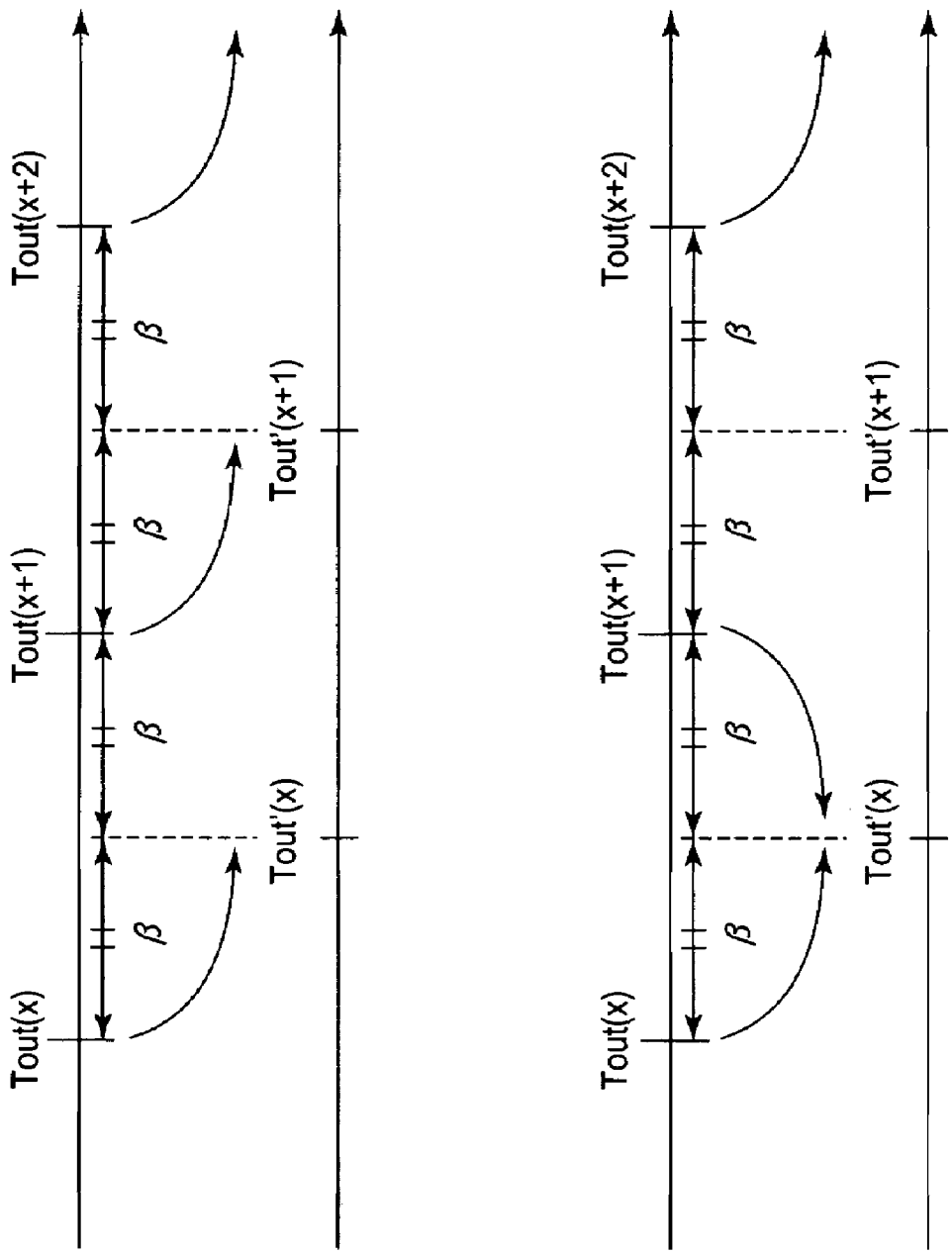
FIG. 3 is a diagram illustrating a method for preventing recess of tone when a couple of Tout' nearest to the Tout exist.

First, the value Tout' nearest to the Tout among the values which can be expressed with the formula of A^Tn×Tm is obtained in the format conversion process 1 (step S4). When two values exist as the Tout' nearest to the Tout, in other words, when both values Tout±α can be expressed as A^Tn× Tm, any of the values Tout+α and Tout−α may be employed as the Tout'. However, it is preferable to determine the rule to select the value used. The reason is that when the relationships Tout (X)+β=Tout'(X), Tout'(X)+β=Tout(X+1), Tout (X+1)+β=Tout'(X+1), Tout'(X+1)+β=Tout(X+2) are set up as illustrated in FIG. 3, if Tout(X)+β=Tout'(X) is employed as the value corresponding to Tout(X) and Tout(X+1)−β=Tout' (X+1) is employed as the value corresponding to Tout(X+1), recess of the tone is generated. However, deterioration in the tone is never generated even in such a case when the Tout(X)+ β=Tout'(X) is employed as the value corresponding to Tout (X) and the Tout (X+1)+β=Tout'(X+1) is employed as the value corresponding to Tout(X+1).

Here, the constant A must be the natural number power of 2. When A is set to the natural number power of 2, multiplication of A^Tn and Tm can be executed only with data shift without use of a multiplier circuit. If A is not the natural number power of 2, scale of the operation circuit in the subsequent stage of the inverse gamma correction circuit cannot be reduced, losing the merit in employment of the floating point representation. For example, when it is attempted to execute the addition of 3^2×33+3^1×25 with the mantissa defined as six (6) bits, while the A as 3, it is required to execute the multiplication of 3^2×33=3^1×(3×33) in order to attain matching between the value of Tn of the first item and the value of Tn of the second item. Moreover, after the addition of the mantissa Tm (99+25=124), the division (124/3) is required to set again the number of bits of the mantissa to six (6) bits. As explained above, since the multiplication and division are required for the addition, the effect which may be attained when the floating point representation is adapted cannot be obtained.

Moreover, it is desirable that a value of M is equal to or less than Y−N. The reason is that the gamma correction process often uses to maintain the accuracy and the circuit scale of LUT can be maintained or reduced with employment of the inverse gamma correction circuit of the present invention. In order to reduce the circuit scale of the circuits in the subsequent stage, the number of bits of at least the mantissa must be smaller than the number of bits in the original integer expression, namely the relationship of M<Y is required.

Moreover, it is also required that the value of N is equal to or larger than 2 when A is 2 and equal to or larger than 1 when A is larger than 2. The reason is that when the value of N is assumed as 1 when A is 2, the value of A^Tn takes only 1 or 2 and this data shift of one (1) bit can be realized by setting the Tm to M+1 bits. Moreover, when A is equal to or larger than 4, even if Tm is set to M+1 bits, the data shift of two (2) bits by A^Tn cannot be realized. Therefore, it is reasonable to employ N=1.

Here, it is not enough that the value of N can take the maximum value. The maximum value of N can be obtained from the value of Tout'. When N becomes large, the value of M must be reduced from the relationship of Y≧M+N. When the value of N becomes large, dynamic range of tone which can be expressed becomes wider, but since the value of M becomes smaller, accuracy is lowered. When the accuracy is lowered, the identical value of Tout' can be obtained from the value of the other Tin. It is recognized, at the time of display, as the problem of recess of the tone and becomes far away from the subject matter of the present invention. Accordingly, it is impossible from the above explanation to use the value which is larger than the maximum value of N providing that a set of the values of Tn and Tm becomes a set of different values for all values of Tin by using the preset constant A and the number of bits M of mantissa.

From above explanation, the values of A, M, and N are limited and the values of Tn and Tm can be obtained on the basis of such values in the format conversion process 2 (step S5). Here, the values of Tn and Tm are set so that the value of Tm becomes as large as possible. The reason is that when the value of Tm becomes larger, the accuracy is improved for the tone as a whole.

Figure 4:
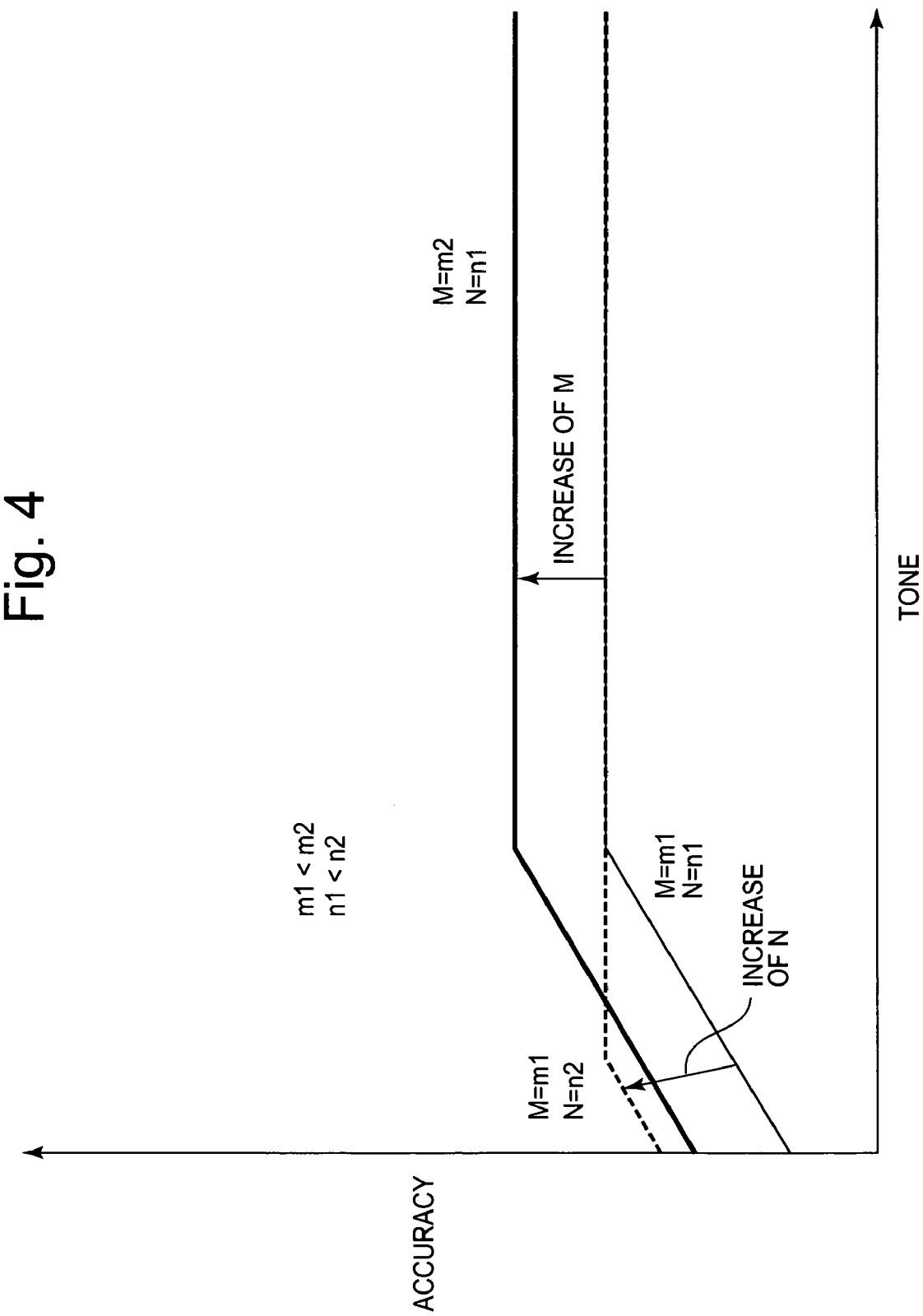
FIG. 4 is a diagram illustrating a relationship between M, N values and accuracy of output signal.

FIG. 4 is a schematic diagram illustrating changes in the tone-accuracy characteristic in case the value of M is increased (when M=m2>m1) and the value of N is increased (when N=n2>n1) with reference to the tone-accuracy characteristic when M=m1 and N−n1 with the tone plotted on the horizontal axis and the accuracy (accuracy is higher when the value is larger) plotted on the vertical axis. First, the tone-accuracy characteristic when M=m1, N=n1, as the reference will be explained. In this case, since the floating point cannot be shifted smaller than 0 in the range where the tone value is small (when N=0), it is covered with the value of Tm and thereby accuracy is lowered as the tone value is reduced. When tone becomes higher, accuracy of Tm can be used in maximum. Therefore, accuracy becomes constant (M digits). Next, When the value of N increases (when N=n2>n1), the floating point is shift in the wider range of tone. Therefore, the accuracy becomes almost constant, except for the range where the tone takes only a small value. However, since the value of M does not change (M=m1), the accuracy when the tone value takes a larger value is identical to that when N=n1. Meanwhile, when the value of M increases (when M=m2>m1), the accuracy increases by (m1−m2) digits for all tone values. Accordingly, it is preferable to make larger the value of Tm with priority than the value of Tn.

However, when operation accuracy is required when the tone is low, it is preferable to enhance the operation accuracy for the lower tone while the value of Tn is set to a certain value in accordance with the required accuracy.

Finally, the Tn and Tm obtained are outputted as the output signals (step S6).

These steps can be executed with single process by summarizing these steps with only one LUT.

With the structure explained above, since Y≧M+N, scale of the LUT required for the inverse gamma correction process can be reduced in comparison with the existing structure. Moreover, since Y>M, operation scale of the multiplier circuit when the multiplication is conducted in the subsequent stage of the inverse gamma correction process (corresponding to the corresponding color reproduction process) can be reduced. Moreover, these processes result in the accuracy which is almost equal to or higher than that of the existing structure for providing the output of Y bits. Namely, image quality is never deteriorated with the inverse gamma correction in the present invention.

The scale of the LUT required for positive gamma correction process can be reduced by indicating, on the contrary from that explained above in the case of the positive gamma correction, the tone signal Tout of Y bits (M+N≦Y) having the linear tone-luminance accuracy as Tout=A^Tn×Tm (A is a constant) with Tn and Tm and then converting the Tout into the tone signal Tin of X bits (X<Y) having non-linear tone-luminance characteristic.

The ranges of the values A, M, and N providing the effect of the present invention have been explained above. Next, the adequate values of M and N for the inverse gamma correction process will then be investigated.

In this example, the value of A is set to 2 for the convenience of explanation. However, the adequate values of M and N can also be obtained by adequately changing the values with the method identical to that explained below even if A takes the other value (natural number power of 2).

The adequate values of M and N can be obtained from the value of Tout obtained in the inverse gamma correction process. An example of the input-output characteristic obtained in the inverse gamma correction process where X=6 and Y=10 in FIG. 5 will be explained. FIG. 5 is a table illustrating a result of comparison between the outputs Tn and Tm of the format conversion process when the number of bits M of the mantissa is set to 5 and 6 under the condition of X=6 and Y=10. The input-output characteristic obtained with the inverse gamma correction process is usually indicated with a monotonously increasing function in order to eliminate generation of inversion of tone (phenomenon in which relationship of brightness and darkness of the inherent signal is inverted).

First, the Tout value near the darkest tone (smallest value) among the values of Tin is investigated. Since the Tout value is converted to the value which is smaller than the input value in the inverse gamma correction process, accuracy of Tin having smaller value is lowered as illustrated in FIG. 1. Therefore, the accuracy required for the inverse gamma correction process (namely, output bit of the inverse gamma correction process: Y) is judged from the Tout when Tin is ranged from 0 to about 3. In FIG. 5, since the Tout value takes the values of 0, 1, 2, and 4 and the minimum difference is 1, the identical value is never taken when the other input value is used (namely, recess of tone is never generated). Accordingly, the value (Y) can take the value 10 as can be estimated.

Next, the values of M and N are set so that difference of the adjacent tones of the value of Tm obtained through conversion from the Tout obtained from all values of Tin becomes equal to one (1) or more. In more practical, difference from the minimum Tout where the most significant bit is one (1) is investigated. The value of Tout where the most significant bit of Tout becomes one (1) for the first time (namely becomes equal to or more than 2^9=512) when Y=10 is equal to 520 (1000001000) as illustrated in FIG. 5 and the Tout increases such as 546 (1000100010), 571 (1000111011) and 598 (1001010110). In this case, when the value of M is 5, values of Tm obtained from these values of Tout becomes 10000, 10001, 10001, and 10010, respectively. In this case, Tm of Tout=546 and Tm of Tout=571 become 10001 and the identical values are continued and thereby recess of tone is generated. Meanwhile, when the value of M is six (6), values of Tm obtained from the Tout value respectively becomes 100000, 100010, 100011, 100101 and the value of Tm corresponding to respective Tout values does not become identical. Accordingly, when the accuracy is identical up to the bright tone from the dark tone, the adequate value of M is six (6) and the value of Tn must be set up to 4 from 0. In order to express the data of Y bits (10 bits) as A^Tn×Tm under the condition of M=6, A=2, and Y=10, it is requested to use Tn which becomes 2^Tn×63≈2^10−1. Since Tm is 10010 when Tout is 546 (1000100010), the value which can be expressed as A^Tn×Tm and is nearest to 546 is 544 (=2^4×34) and the Tn is requested to take the value up to 4.

Moreover, it is also required to satisfy the relationship of Tn=2^(2^N−1)≧2^(Y−M) because data shift of the remaining Y−M bits obtained by removing the M bits of more significant bits from the original data of Y bits is expressed with N. When it is solved for the N, the result N≧log(1+Y−M)/log 2 can be obtained. Accordingly, the value of N can be obtained, when the value of M is determined, as the minimum integer value which is equal to or larger than log(1+Y−M)/log 2. In above example, the value of N becomes 3 as the minimum value because of log(1+10−6)/log 2=2.322.

In addition, the value of M or N is increased for obtaining a still higher accuracy. For example, since accuracy of bright tone is mainly determined by M, it is enough to increase the value of M. In addition, since the accuracy of dark tone is related also to the values of M and N, it is enough to increase the value of M or N.

With the method explained above, adequate values of M and N can be set with the value of the inverse gamma correction process.

The preferred embodiments of the present invention based on the principle explained above will then be explained below.

First Embodiment

Figure 6:
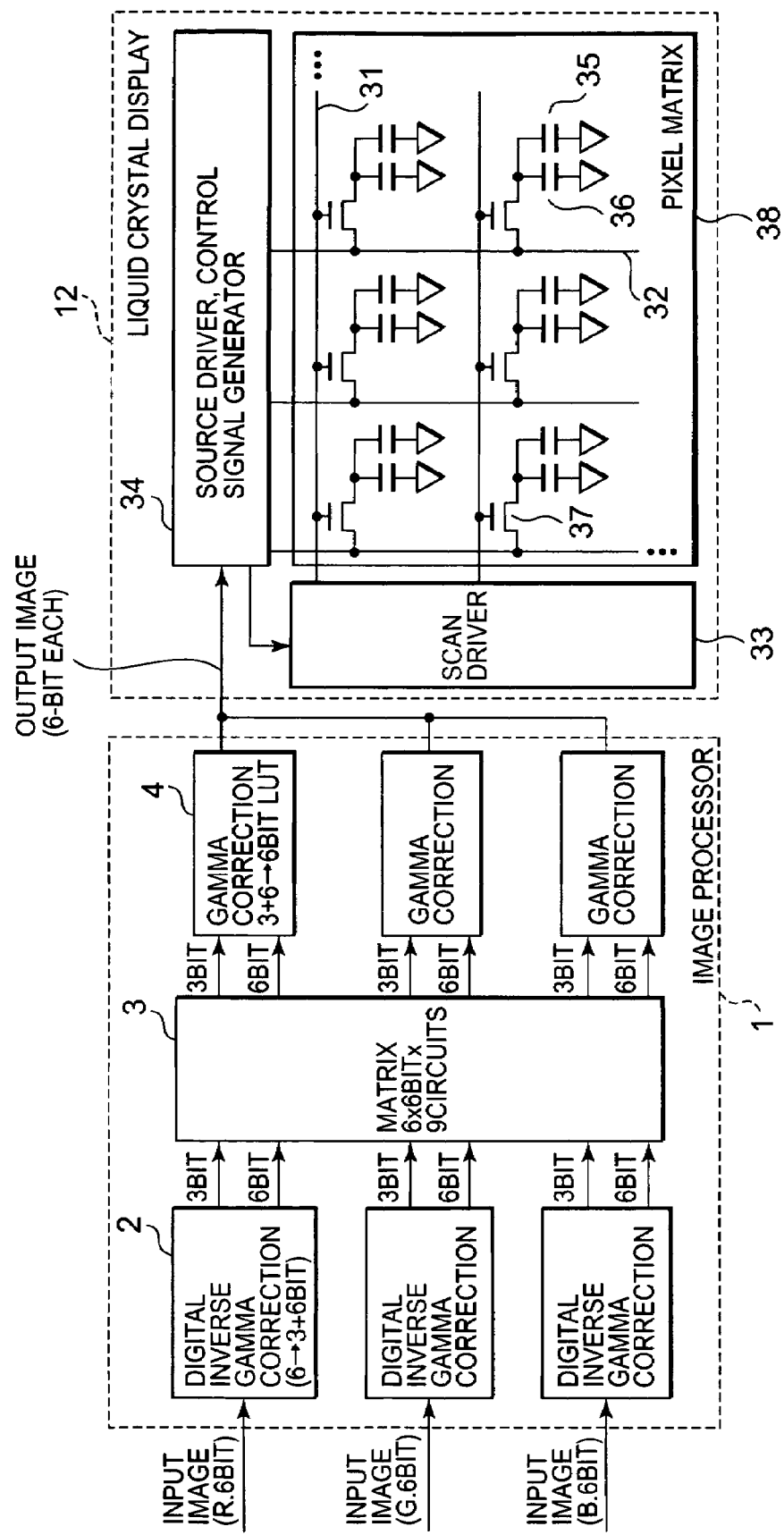
FIG. 6 is a diagram illustrating a structure of a liquid crystal display apparatus of a first embodiment of the present invention.

A first preferred embodiment of the present invention will be explained. FIG. 6 illustrates a structure of a liquid crystal display apparatus of this first embodiment. This liquid crystal apparatus is provided with an image processor 1 and a liquid crystal display 12. This liquid crystal display apparatus inputs a digital image signal (for example, RGB signal, six bits in each color) as the input signal to the image processor 1, outputs the digital image signal to the liquid crystal display 12 after execution of various operations in the image processor 1, determines transmissivity of pixels of the liquid crystal display 12 in accordance with the digital image signal, and displays images in accordance with such digital image signal.

Here, the input-output signal of the image processor is expressed in the tone with six (6) bits for each color but the number of bits is not limited to six (6) bits.

The image processor 1 is a function unit for corresponding color reproduction by converting the image signal in accordance with the chromaticity characteristic of the liquid crystal display 12. The image processor 1 includes an inverse gamma correction circuit 2, a color space conversion circuit 3 and a positive gamma correction circuit 4. The inverse gamma correction circuit 2 and the positive gamma correction circuit 4 are individually provided for each color element. The digital image signal inputted to the image processor 1 is subjected to the sequential operation processes in the inverse gamma correction circuit 2, color space conversion circuit 3 and positive gamma correction circuit 4 and an output from the positive gamma correction circuit 4 is sent, as the output signal, to a DA converter not illustrated in a source driver, control signal generator 34.

The liquid crystal display 12 includes a scan driver 33, the source driver, control signal generator 34, and a pixel matrix 38.

The pixel matrix 38 includes a plurality of scanning lines 31, a plurality of signal lines 32, pixels 35, auxiliary capacitances 36, and thin film transistors (TFTs) 37. Each scanning line 31 and each signal line 32 are crossing with each other and each intersecting point of the scanning line 31 and signal 32 is provided with a pixel 35 via a TFT 37. Each pixel 35 is connected in parallel with each auxiliary capacitance 36.

A scan driver 33 controls the signal to be inputted respectively to a plurality of scanning lines 31. The source driver, control signal generator 34 controls the signal to be inputted respectively to a plurality of signal lines 32.

Here, the process up to display of image on the liquid crystal display 12 from input of the digital image signal to the liquid crystal display apparatus will then be explained below. The image processor 1 outputs the digital signal through the operation process of the input digital signal. The output image signal and the display control signal (not illustrated) are sent to the scan driver 33 and source driver, control signal generator 34. The source driver, control signal generator 34 executes DA conversion of the digital image signal on the basis of the application voltage-luminance characteristic of the pixel 35 of the liquid crystal display 12 and the conversion characteristic obtained from the gamma characteristic of the input image signal. The signal converted to an analog signal is the applied, to the pixel 35 connected to the scanning line 31 to which an ON voltage is impressed selectively with the scan driver 33 via the TFT 37 and is then outputted as the image signal through conversion into luminance.

Figure 7:
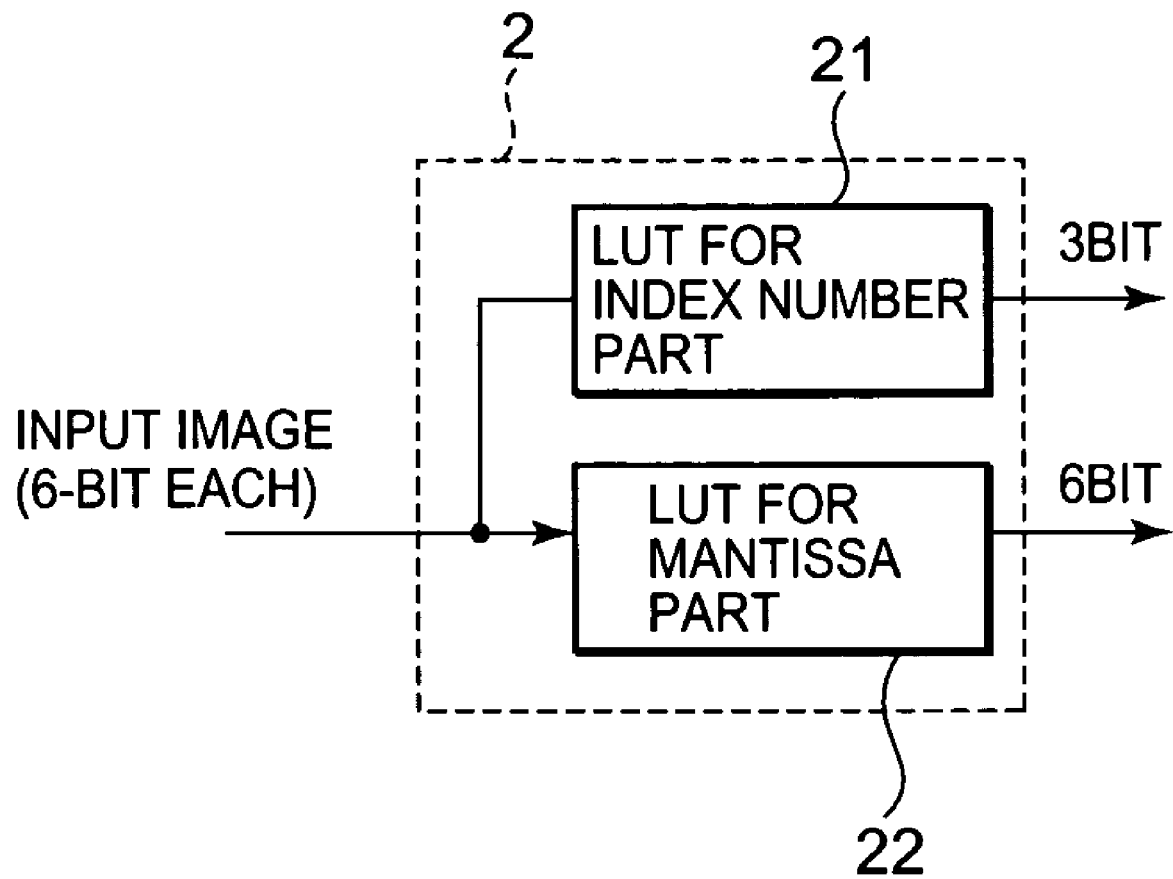
FIG. 7 is a diagram illustrating a structure of a digital gamma correction circuit of the liquid crystal display apparatus of the first embodiment.

FIG. 7 illustrates a detail structure of the inverse gamma correction circuit 2. This inverse gamma correction circuit 2 is formed of a lookup table (LUT) 21 for index number and an LUT 22 for mantissa. The LUT for index number 21 and the LUT for mantissa 22 receive the identical digital signal as the input signal. In these LUTs 21 and 22 for index number of mantissa, a value in accordance with the input signal is obtained with reference to the LUT and this value is then outputted as the output digital signal. An output of the LUT 21 for index number is the value of three (3) bits (index number signal) and an output of the LUT 22 for mantissa is the value of six (6) bits (mantissa signal) The signals respectively outputted from the LUTs 21 and 22 for index number and mantissa are sent to a color space conversion circuit 3.

Here, the LUT for index number and the LUT for mantissa are formed as individual structures, but it is also possible to provide only one LUT for output of nine (9) bits, in which the six (6) bits output is provided for mantissa, while the remaining three (3) bits output is provided for index number.

Figure 8:
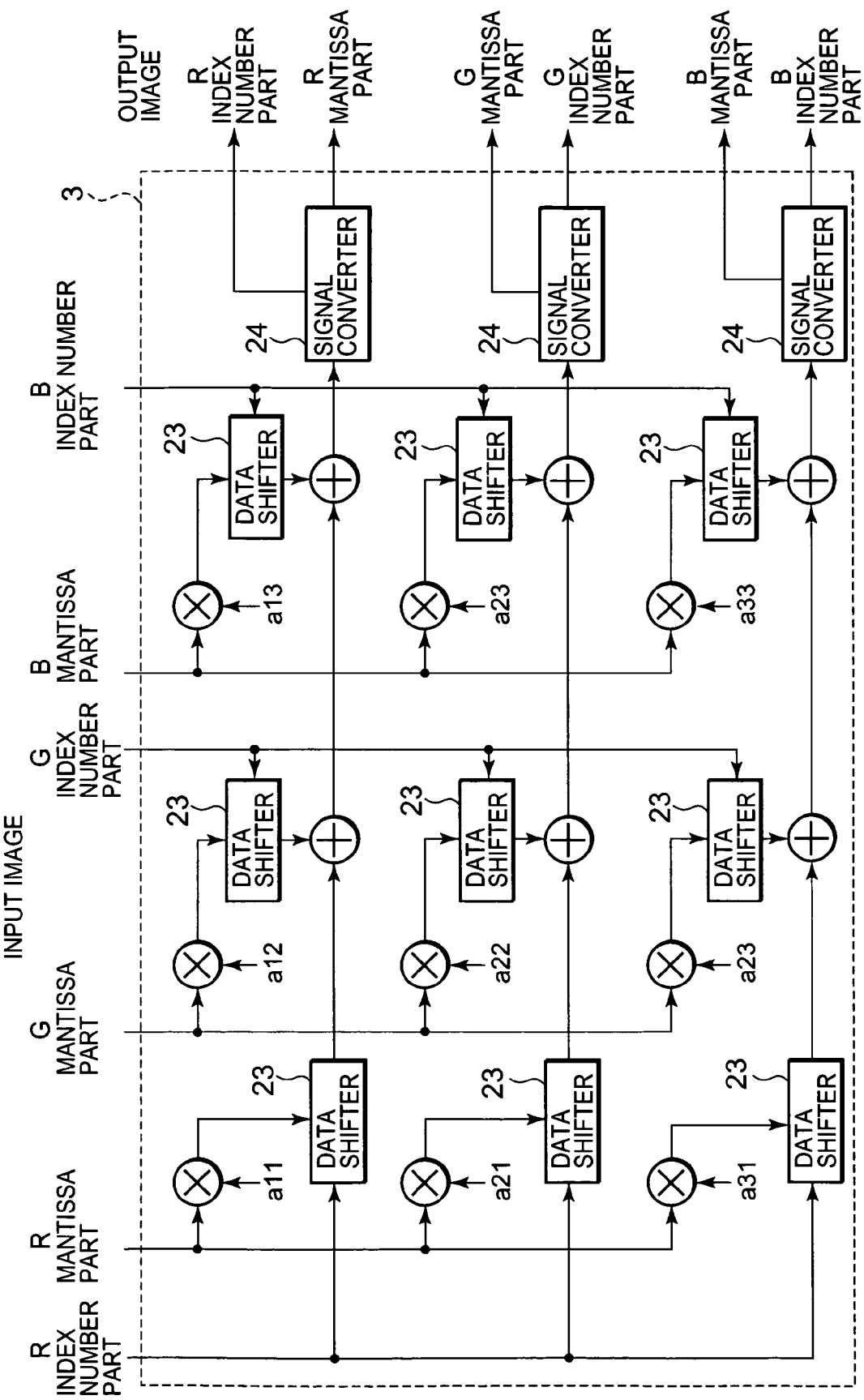
FIG. 8 is a diagram illustrating a structure of a color space conversion circuit of the liquid crystal display apparatus of the first embodiment.

FIG. 8 illustrates a detail structure of the color space conversion circuit 3. The color space conversion circuit 3 is constituted with nine multiplier circuits for multiplications of the mantissa signals of RGB and three constants (axy(x,y=1, 2, 3)), a data shifter 23 for data shift of the corresponding multiplication results on the basis of the index number signals of RGB, six (6) adders for adding the results of data shift, and a signal converter 24 for dividing again the addition result into the index number and the mantissa. As is apparent from the structure illustrated, the color space conversion circuit 3 executes the 3×3 matrix operation.

Figures 9, 10:
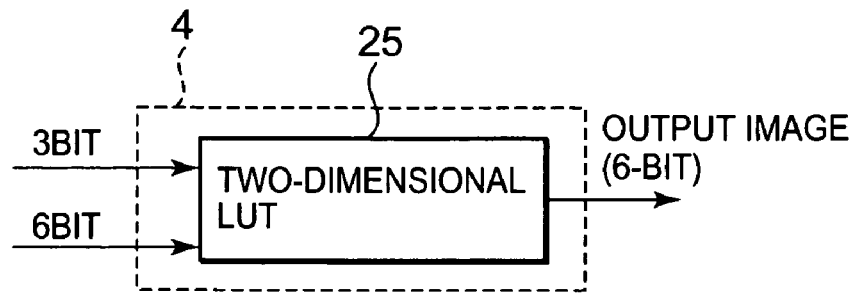
FIG. 9 is a diagram illustrating a structure of a positive gamma correction circuit of the liquid crystal display apparatus of the first embodiment.
FIG. 10 is a diagram illustrating a structure of an LUT provided in the positive gamma correction circuit of the liquid crystal display apparatus of the first embodiment.

FIG. 9 illustrates a structure of the positive gamma correction circuit 4. The positive gamma correction circuit 4 is formed of a two-dimensional LUT 25 in which the index number signal and the mantissa signal are respectively defined as the number of rows and columns in the secondary two-dimensional arrangement. The positive gamma correction circuit 4 obtains the values in accordance with the input index number signal and the input mantissa signal with reference to the two-dimensional LUT 25 and then outputs this value as the output signal (six (6) bits).

Next, operation and effect attained by the liquid crystal display apparatus of this embodiment will be explained.

In the image process circuit of FIG. 6, the circuit scale of the color space conversion circuit 3 in the subsequent stage can be reduced without lowering accuracy by utilizing the tone expression based on the floating point system as an output of the inverse gamma correction circuit 2. Operations of each circuit will be explained in detail along the flow of the image signal.

The inverse gamma correction circuit 2 illustrated in FIG. 7 executes the inverse gamma correction using the LUT and also converts the tone expression method into the method based on the floating point representation.

In the case of conducting the inverse gamma correction to the six (6) bits signal, accuracy cannot be maintained, in the ordinary tone expression (fixed point), if an output after correction is set to 10 bits or more ($2^{\wedge}(9-1)=512$ tones or more), but in the method based on the floating point representation, a value equal to or more than 10 bits ($2^{\wedge}4 \times 63 = 1008$ tones) in the fixed point display can be obtained by setting the output to three (3) bits index number (only 0 to 4 in the decimal number)+six (6) bits mantissa. Namely, since ten bits which have been required in the ordinary expression can be reduced to nine (9) bits (=3+6), the inverse gamma correction circuit 2 can be reduced in size in its constitution more than the circuit to conduct the inverse gamma correction to the signal expressed by the fixed point.

The matrix operation circuit (color space conversion circuit 3) at the time of tone expression using the method based on the floating point representation illustrated in FIG. 8 is provided, in the subsequent stage of each multiplication circuit, with a circuit, unlike the ordinary matrix operation circuit, for shifting the data in accordance with the value of index number. The processes until the process in the signal converter 24 from input of the signal to the color space conversion circuit 3 are expressed by the following formula (1) when the index number of input signal is defined as Xa, the mantissa as Xb(X=R, G, B).

$$Rout = \frac{2^{\wedge}Ra \times (Rb \times a11) + 2^{\wedge}Ga \times (Gb \times a12) + 2^{\wedge}Ba \times}{(Bb \times a13),} \quad (1)$$

$$Gout = \frac{2^{\wedge}Ra \times (Rb \times a21) + 2^{\wedge}Ga \times (Gb \times a22) + 2^{\wedge}Ba \times}{(Bb \times 23),}$$

$$Bout = \frac{2^{\wedge}Ra \times (Rb \times a31) + 2^{\wedge}Ga \times (Gb \times a32) + 2^{\wedge}Ba \times}{(Bb \times a33)}$$

Operation (X=R, G, B) of $2^{\wedge}Xa$ times in the formula (1) is conducted in the data shifter 23 through the shift of Xa bits. This operation output is then outputted through conversion into the index number and the mantissa with the signal converter 24. Since the data shifter 23 conducts the operation of index number, the multiplication process can be simplified. Therefore, the effect of the present invention can be attained when the operation of the index number conducted by the data shifter 23 is for example the operation of raised power of 2 such as $4^{\wedge}Ra$ times and $8^{\wedge}Ra$ times.

Here, since the number of bits of mantissa is identical to the number of input bits, the circuit scale of the multiplier circuit can be reduced remarkably. In the ordinary structure, the operations of 10 bits×six (6) bits have been conducted but this operation is converted to that of six (6) bits×six (6) bits, resulting in the reduction of circuit scale of about 40 percents. Moreover, since the circuit scale of the data shifter 23 and signal converter 24 is not so large, the circuit configuration may be reduced by about 30 percents more than the ordinary configuration.

Next, the positive gamma correction based on the floating point representation is performed using the two-dimensional LUT (two-dimensional LUT 25) in which the values of index number and mantissa are respectively set to the xy axes. FIG. 10 illustrates the structure of the LUT of the positive gamma correction circuit wherein the input is formed of three (3) bits index number (only 0 to 4 are used)+six (6) bits mantissa, while the output is formed of six (6) bits. Since the index number value is ranged to 0 to 4, while the mantissa value to 0 to 63, the number of bits required for the LUT reaches 1920 bits (=5×64×6 bits). However, when the value of index number is equal to or larger than one (1) and the most significant bits of mantissa is 0, the value of index number is reduced by one (1) and the value of mantissa is doubled. Accordingly, it is not always required to hold the LUT for all combinations of the index number and mantissa (the domain surrounded by doubled-frame in FIG. 10 (domain where the value of index number is equal to or larger than one (1) and the most significant bit of mantissa is, 0) is not required).

As illustrated in the figure, when the index number is "0", the mantissa takes any value of "0 to 63", while when the index number is "1 to 4", the mantissa takes any value of "32 to 63". Since the output is six (6) bits in any case, the scale of the positive gamma correction circuit 4 may become as explained below.

When the index number is "0", the mantissa can take the values of "0 to 63", namely $2^{\wedge}6$ values. Since the output is six (6) bits for respective values, a memory for $2^{\wedge}6 \times 6$ bits is required. Meanwhile, when the index number is "1 to 4", the mantissa can take the value of "32 to 63", namely $2^{\wedge}5$ values. Since the output is six (6) bits for respective values, a memory for $2^{\wedge}5 \times 6 \times 4$ bits is required. Namely, the memory of ($2^{\wedge}6 \times 6$) bits+($2^{\wedge}5 \times 6 \times 4$) bits is required for each color. In the case of the RGB color image, the number of bits as many as that explained above is required for each color element (however, the number of input-output bits of each color element of RGB is assumed as identical). Therefore, the number of bits required for LUT is indicated below. Input 3+6 bits-->output six (6) bits:

(2^6×6+2^5×6×4)×3(RGB)=152×3 bits

In the case of the related art, the positive gamma correction circuit converts an input signal of 10 bits to an output signal of 6 bits, so the number of bits required is $2^{\wedge}10 \times 6 \times 3 = 6144 \times 3$ bits. Therefore, the circuit scale can be reduced considerably in the present invention.

Here, the circuit scale of the matrix operation circuit (adder circuit, multiplier circuit) and positive gamma correction circuit (LUT) in the subsequent stage can be reduced by applying the method on the basis of the floating point representation.

With the effect explained above, it is possible to provide an image process apparatus and a display apparatus in which the circuit scale has been reduced by application of the digital gamma correction circuit.

In above structure, the inverse gamma correction circuit is constituted with integration of the inverse conversion circuit and the format conversion circuit. The present embodiment is not limited thereto and the effect of the present invention can also be attained when the inverse gamma correction circuit and the format conversion circuit are formed individually.

In above explanation, the number of bits of digital tone has been set to six (6) bits but the present invention is not limited thereto and the identical effect can also be attained when such number of bits of digital tone is set to the desired number of bits, for example, to eight (8) bits.

Figure 11:
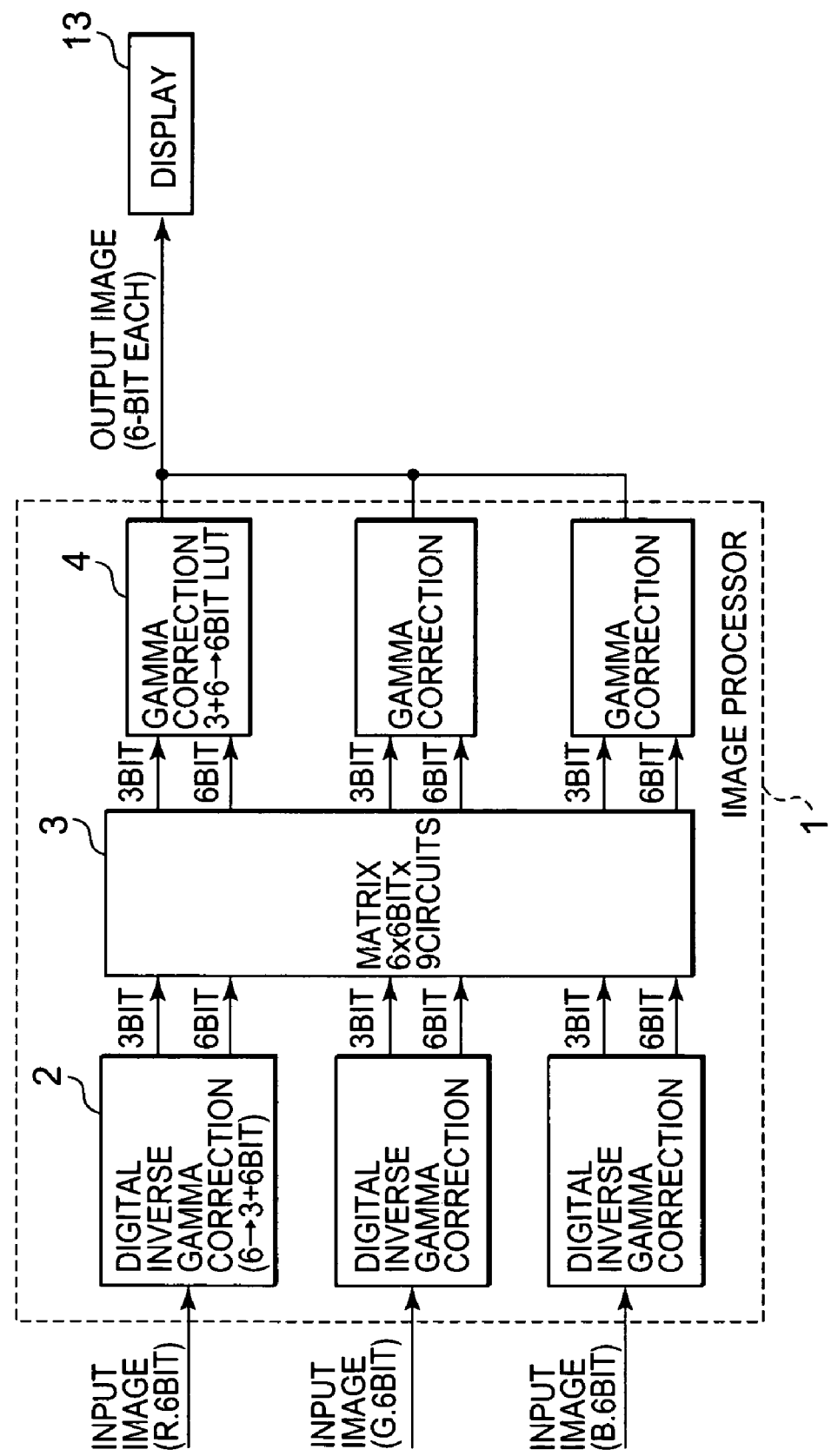
FIG. 11 is a diagram illustrating a structure of a display apparatus using the display of the system different from the liquid crystal.

Moreover, in the present embodiment, the liquid crystal display has been used as a display, but the present embodiment is not limited thereto. The similar effect can also be attained even when the other display apparatus (PDP, display using electro-luminescence element, or liquid crystal projector or the like) is used as illustrated in FIG. 11.

Second Embodiment

A second embodiment of the present invention will be explained.

Figure 12:
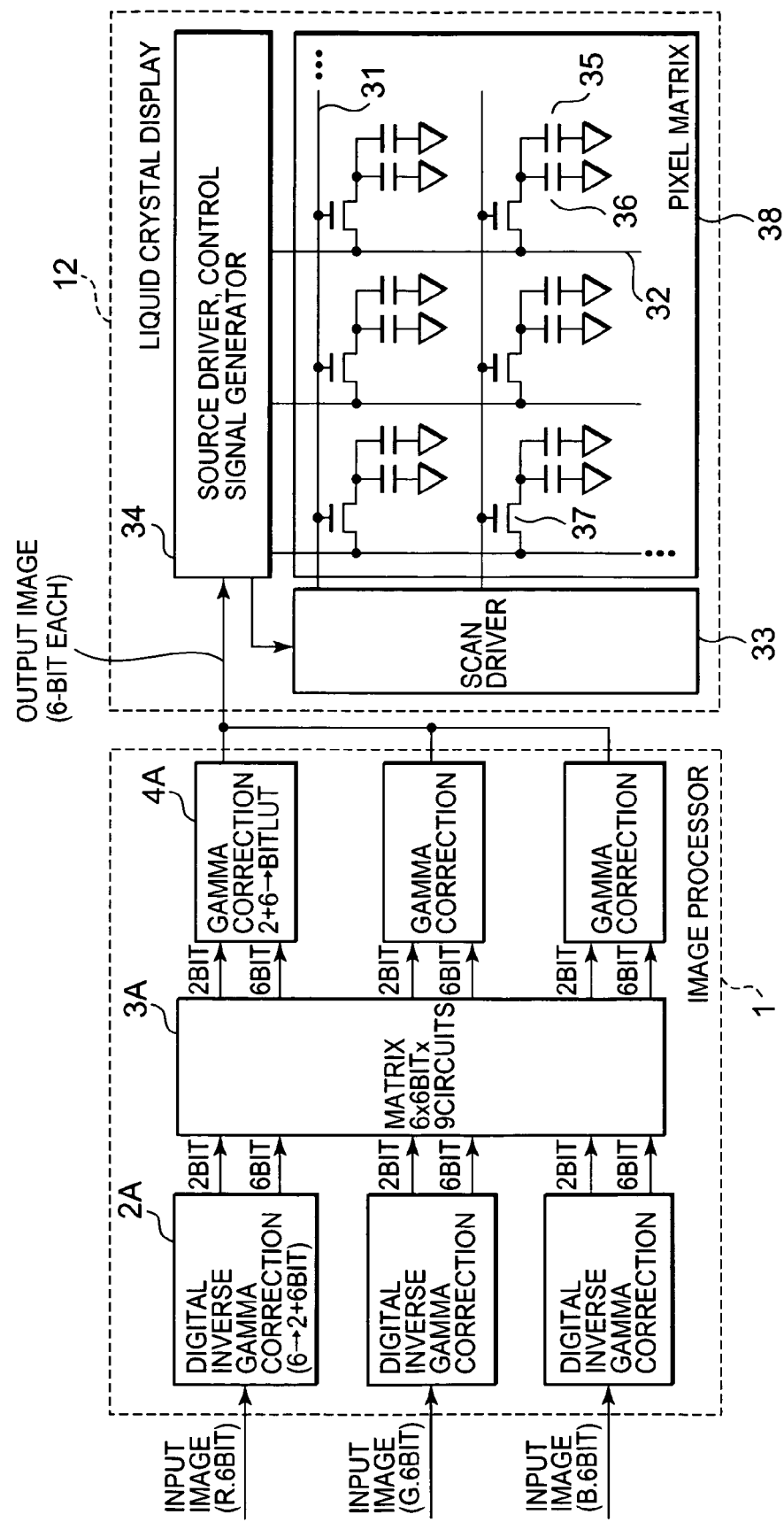
FIG. 12 is a diagram illustrating a structure of a liquid crystal display apparatus of a second embodiment of the present invention.

FIG. 12 illustrates a structure of the liquid crystal display apparatus of this embodiment. This liquid crystal display apparatus is almost identical to the image processor 1 of the liquid crystal display apparatus of the first embodiment, but the inverse gamma correction circuit 2A, color space conversion circuit 3A, and positive gamma correction circuit 4 are different in the constitution from the liquid crystal display apparatus of the first embodiment. The positive gamma correction circuit 4 is identical to that of the first embodiment except for that the data of six (6) bits is outputted for the input data of two (2) bits+six (6) bits.

Figure 13:
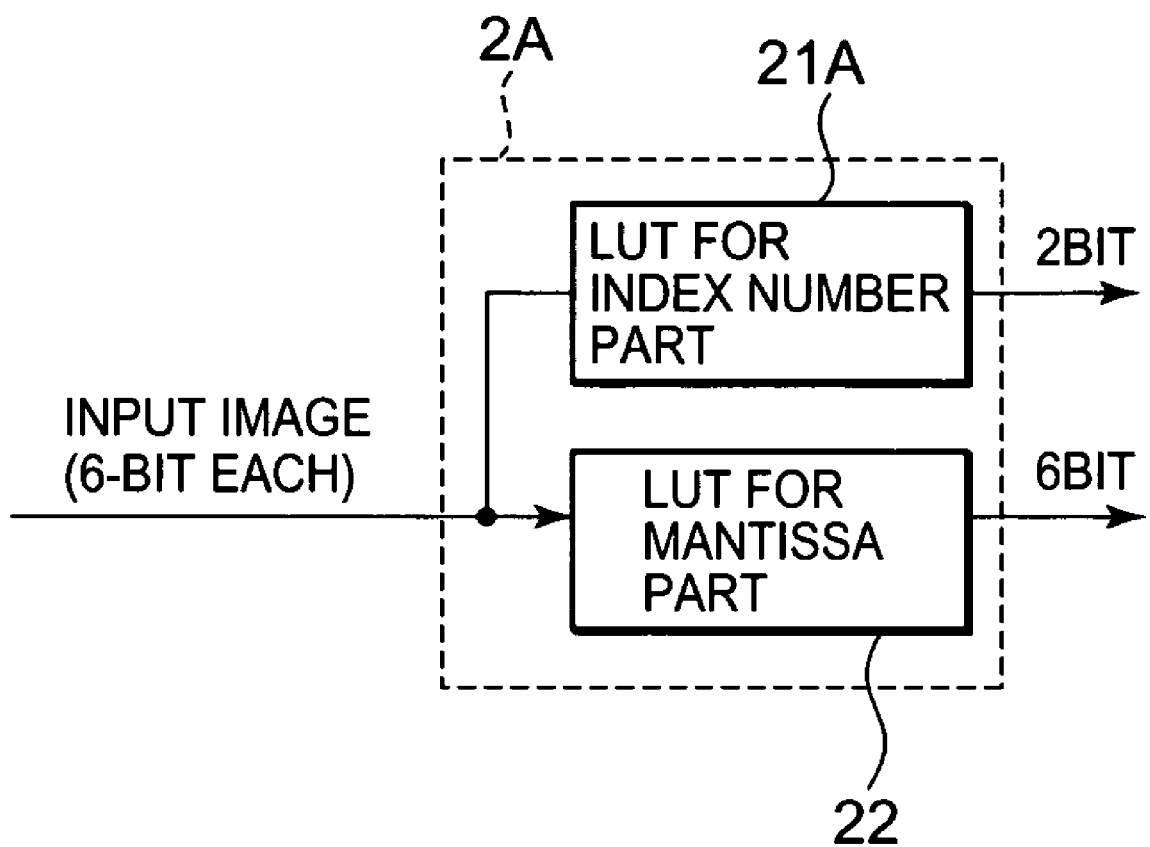
FIG. 13 is a diagram illustrating a structure of the digital inverse gamma correction circuit of the liquid crystal display apparatus of the second embodiment.

FIG. 13 illustrates a structure of the inverse gamma correction circuit 2A. The inverse gamma correction circuit 2A includes the LUT for index number 21A and the LUT for mantissa 22. The LUT for mantissa 22 is similar to that of the liquid crystal display apparatus of the first embodiment. The LUT for index number 21A is different from that of the first embodiment in the point that a value of two (2) bits is outputted to the input image signal of six (6) bits in each color. Like the first embodiment, the identical signal is inputted to the LUT for index number 21A and LUT for mantissa 22.

In the first embodiment, the value of three (3) bits as the output of the LUT for index number 21 is used in direct as the index number of tone expression. Meanwhile, in this second embodiment, the output of the LUT for index number 21A is not used in direct as the index number of tone expression and it is encoded (assigned) to the other value based on the output value (for example, 0, 2, 3, 4 in place of 0, 1, 2, 3). Namely, the output of the LUT for index number 21A is identical in the number of items to the number of values which the output value of the LUT for index number 21A can take, and is assigned to the value of any item of the sequence formed of the integers equal to or larger than 0 increasing from the initial item in unequal differences.

The value which is larger than "3" as the maximum value of output of the LUT 21A can be set as Ra by conducting the encoding so that Ra=0 when the two (2) bits output of the LUT for index number 21A is 0, Ra=2 when the output is 1, Ra=3 when the output is 2, and Ra=4 when the output is 3. When Ra is 1, the output value of the mantissa part is changed so that Ra becomes $2^1 \times 18 = 2^2 \times 9$).

With implementation of such encoding, tone expression can be realized in wider dynamic range while the number of output bits of the LUT for index number 21A is controlled. The LUT for index number 21A can be reduced in the circuit scale because the number of output bits is controlled.

Figure 14:
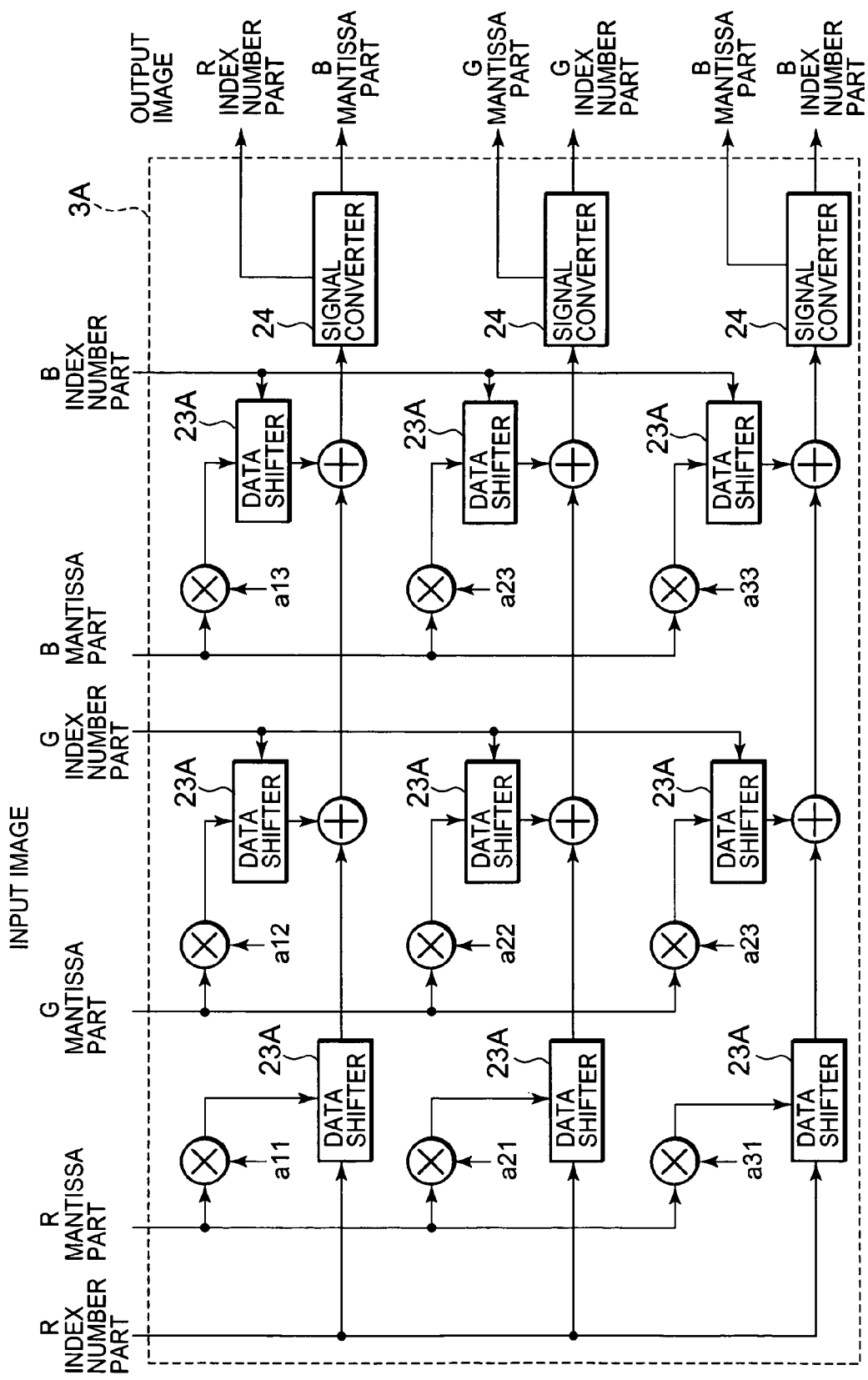
FIG. 14 is a diagram illustrating a structure of the color space conversion circuit of the liquid crystal display apparatus of the second embodiment.

The data of index number assigned to the other value is transmitted to the color space conversion circuit 3A. FIG. 14 illustrates a structure of the color space conversion circuit 3A. This circuit is almost identical to the color space conversion circuit 3 of the liquid crystal display apparatus of the first embodiment, but the data shifter 23A is substituted for the data shifter 23. The data shifter 23A executes the decoding (resetting, to the original value, the output value of the LUT 21A converted to the other value) corresponding to the encoding in the LUT for index number 21A to determine the amount of shift. When the scale of the circuit for this decoding is sufficiently small, the total circuit scale can also be reduced. In other words, when the scale of the circuit for converting the output value of the LUT for index number 21A assigned to the other value is smaller than reduction of the circuit scale of the LUT 21A reduced by assigning the output value to the other value, the total circuit scale can also be reduced.

With the structure explained above, the circuit scale of the color space conversion circuit (matrix operation circuit (adder circuit and multiplier circuit)) and the positive gamma correction circuit (LUT) located in the subsequent stage of the inverse gamma correction circuit can be reduced.

In addition, the circuit scale of the image process apparatus and the display apparatus can also be reduced by applying this digital gamma correction circuit.

Third Embodiment

A third embodiment of the present invention will be explained below.

In the first and second embodiments, the image process circuit in the subsequent stage of the digital gamma correction circuit has been provided for corresponding color reproduction. In this embodiment, a structure in which the image process circuit for the object different from the corresponding color reproduction is provided in the subsequent stage of the inverse gamma correction circuit will be explained.

Figure 15:
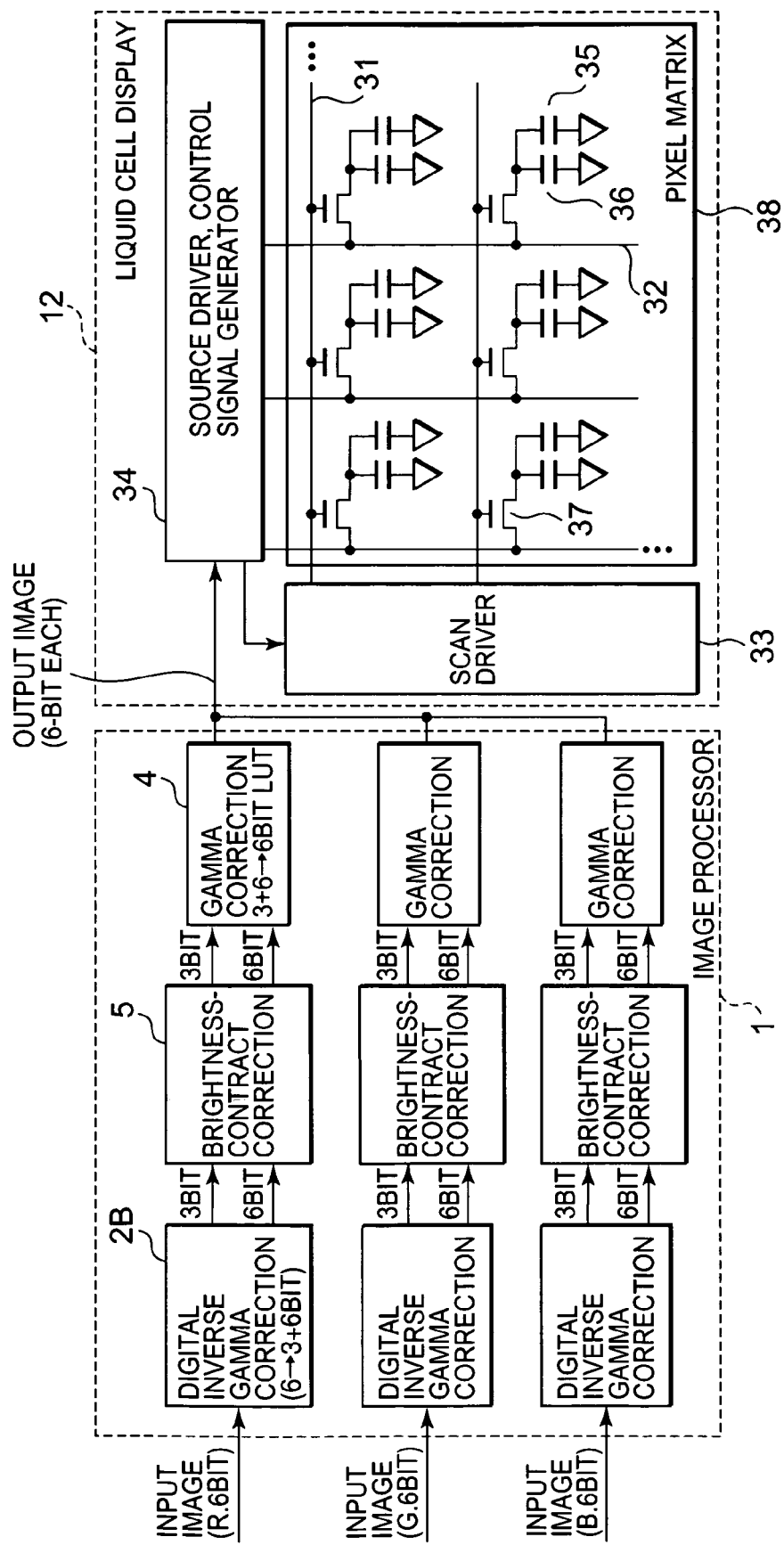
FIG. 15 is a diagram illustrating a structure of a liquid crystal display apparatus of a third embodiment of the present invention.

FIG. 15 illustrates a structure of the liquid crystal display apparatus of this embodiment.

This liquid crystal display apparatus is almost equivalent to that of the first embodiment and is different only in the point that the inverse gamma correction circuit 2B is substituted for the inverse gamma correction circuit 2, while a brightness-contrast correction circuit 5 for the color space conversion circuit 3.

Figure 16:
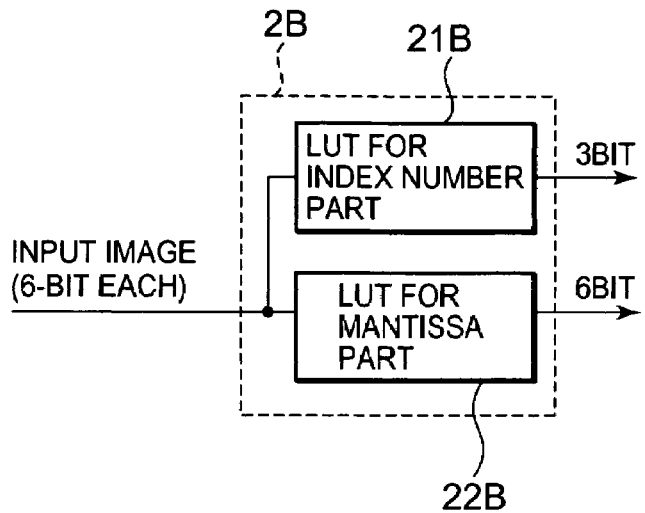
FIG. 16 is a diagram illustrating a structure of the digital inverse gamma correction circuit of the liquid crystal display apparatus of the third embodiment.

FIG. 16 illustrates a structure of the inverse gamma correction circuit 2B. Like the inverse gamma correction circuit 2 of the first embodiment, the identical image signal is inputted to both LUT for index number 21B and the LUT for mantissa 22B. The LUT for index number 21B outputs the index number signal of three (3) bits for the input signal of six (6) bits, while the LUT for mantissa 22B outputs the mantissa signal of six (6) bits for the input signal of six (6) bits.

The RGB image signals inputted to the image process circuit 1 are divided into the index number and the mantissa in the inverse gamma correction circuit 2B and are outputted as the index number signal and the mantissa signal.

In the inverse gamma correction circuit 2B, inverse gamma correction of the gamma value 1 may be executed. In the case where the inverse gamma correction is implemented with the gamma value different from one (1), it is enough to use the LUT similar to that in the first and second embodiments as the LUT for index number 21B and LUT for mantissa 22B. Meanwhile, when the inverse gamma correction is implanted with the gamma value 1, it is enough to use the LUT to convert the input signal to the tone expression in the floating point system with the similar method as explained above.

Figure 17:
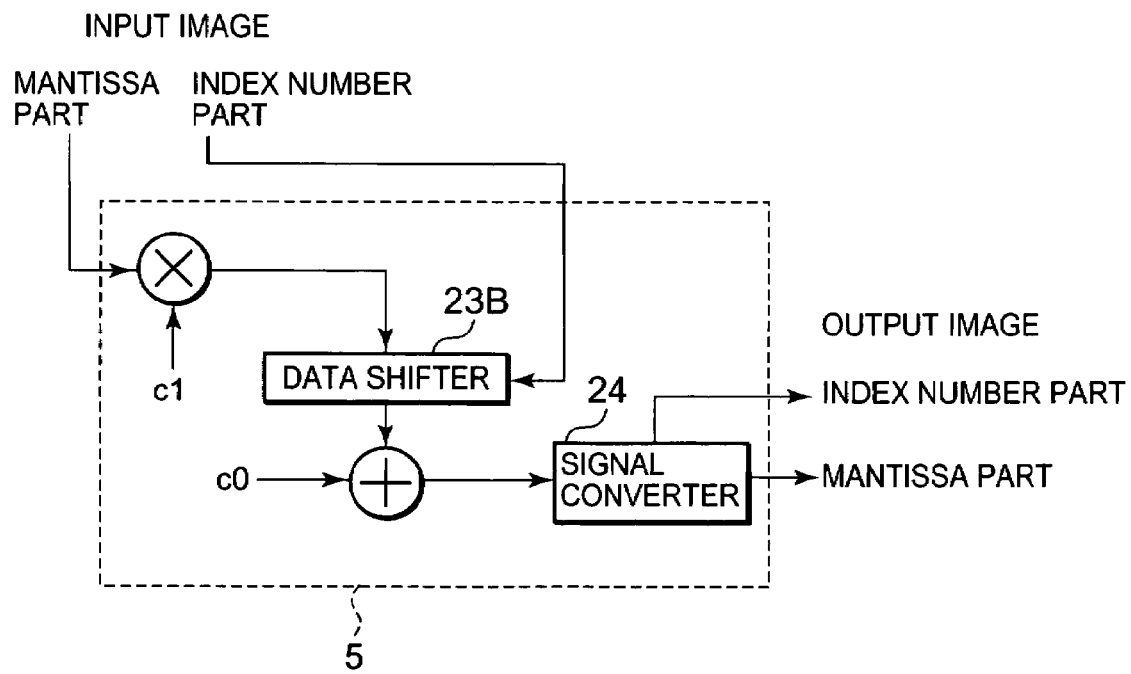
FIG. 17 is a diagram illustrating a structure of a brightness-contract correction circuit of the liquid crystal display apparatus of the third embodiment.

As illustrated in FIG. 16, in the inverse gamma correction circuit 2B, since the number of input bits is six (6) bits, the number of output bits is three (3) bits for index number and six (6) bits for mantissa, conversion is executed to obtain sufficient accuracy in such a degree as not allowing the maximum value of the index number part to increase too much as in the case of each embodiment explained above. That is, the index number is 3 and the mantissa is 63 when the input signal is 63 which is a maximum value of the tone signal, $2^3 \times 63 = 504$. The index number is 0 and the mantissa is 8 when the input signal is 1 because of $504/63 = 8 = 2^0 \times 8$ The signal outputted from the inverse gamma correction circuit 2B is then inputted to the brightness-contract correction circuit 5. As illustrated in FIG. 17, following process is executed when the index number of the input signal to the brightness-contract correction circuit 5 is a and the mantissa as b.

$$(\text{Output}) = 2^a \times (b \times c1) + c0$$

Operation of 2a times in the above formula is conducted with the bit shift of a in the data shifter 23B. This operation output is then converted again into the index number and the mantissa with the signal converter 24 to output these data.

Here, when the value of c1 is set to 1 and the value of c0 to 0, it is equivalent to that nothing is done in this step. When the value of c1 is set to 1 or more, an image of higher contrast can be obtained and when c1 is set to 1 or less, an image of lower contrast can be obtained. Moreover, c0 means offset and when c0 takes a value larger than 0, brightness of image can be increased. Moreover, the desirable contract-brightness correction can be realized by changing combination of c0 and c1.

When the input tone value is small, the operation accuracy in the brightness-contrast correction circuit 5 becomes higher when the tone expression conducted in separation for the index number and mantissa than that in the ordinary tone expression. Therefore, even when the circuit is the subsequent stage of the inverse gamma correction executes the image process for the purpose which is different from corresponding color reproduction, operation of higher accuracy can be realized without increase in the circuit scale of the operation circuit (adder circuit, multiplier circuit) and positive gamma correction circuit (LUT).

Moreover, application of this digital gamma correction circuit enables reduction in the circuit scale of the image process apparatus and display apparatus.

Fourth Embodiment

A fourth embodiment of the present invention will be explained.

In each embodiment explained above, the gamma correction process has been conducted with digital process in the gamma correction circuit of the image process circuit. In this embodiment, a structure to conduct the positive gamma correction process in the DA converter will be explained.

Figure 18:
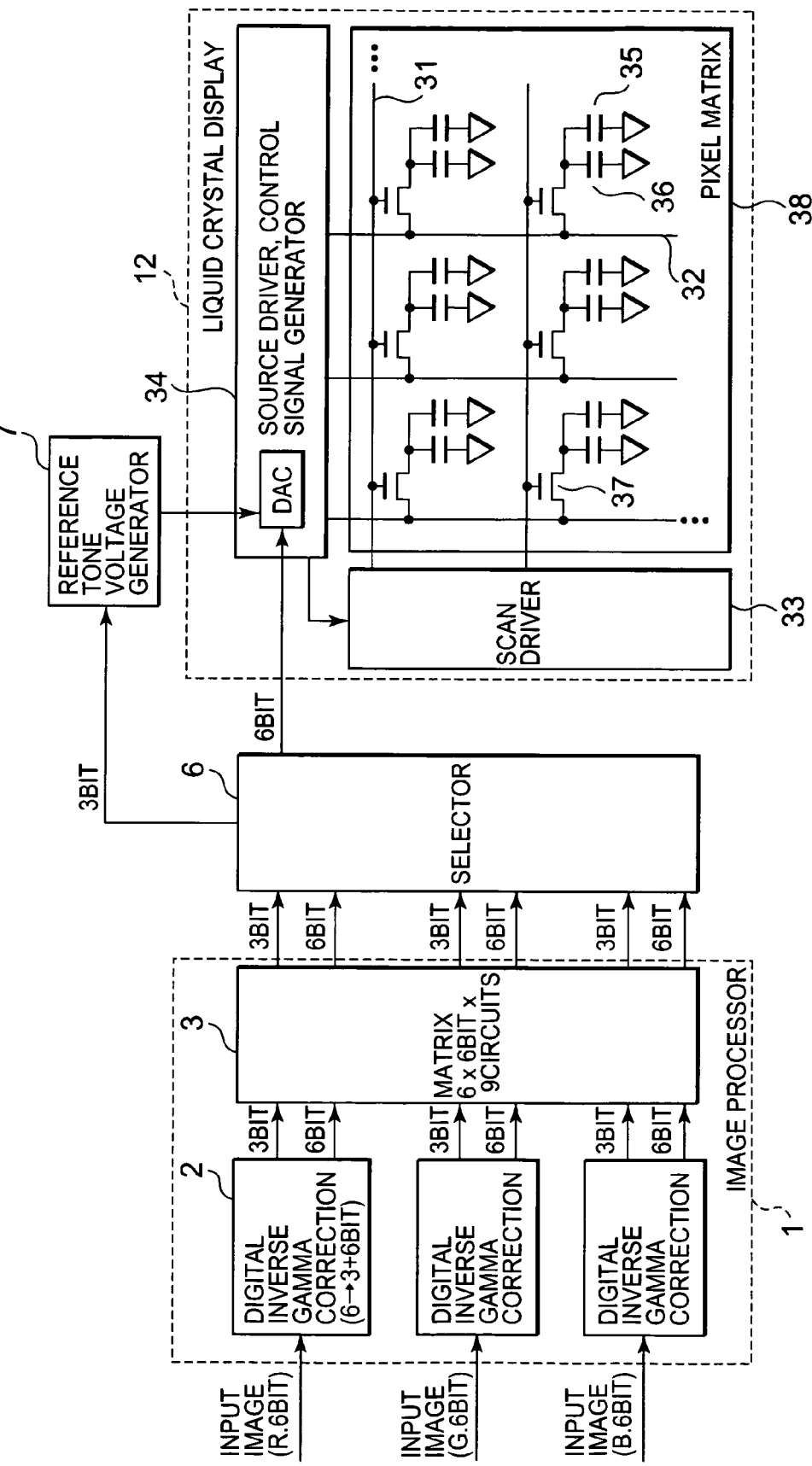
FIG. 18 is a diagram illustrating a structure of a liquid crystal display apparatus of a fourth embodiment of the present invention.

FIG. 18 illustrates a liquid crystal display apparatus of this embodiment. This liquid crystal display apparatus includes an image processor 1, a selector 6, a reference tone voltage generator 7 and a liquid crystal display 12.

The selector 6 sequentially selects a set among the sets of the index number signal and the mantissa signal inputted from the color space conversion circuit 3 and then outputs this selected set.

The reference tone voltage generator 7 outputs a plurality of reference voltages on conversion by the DAC.

The liquid crystal display apparatus of this embodiment conducts the process (positive gamma correction), which has been conducted with the positive gamma correction circuit 4 in the liquid crystal display apparatus of the first embodiment, with the converter (DAC) in the source driver, control signal generator 34 and the reference tone voltage generator 7.

The index number signal among the output signals of the selector 6 is outputted to the reference tone voltage generator 7 and the mantissa signal is outputted to the DAC within the source driver, control signal generator 34.

The structure illustrated in the figure executes the positive gamma correction through the serial conversion of the RGB parallel signal with the selector 6, but it is also possible to employ the structure to execute the parallel process with the structure including individually the reference tone signal generator 7 and DAC respectively for each color of RGB.

Figure 19:
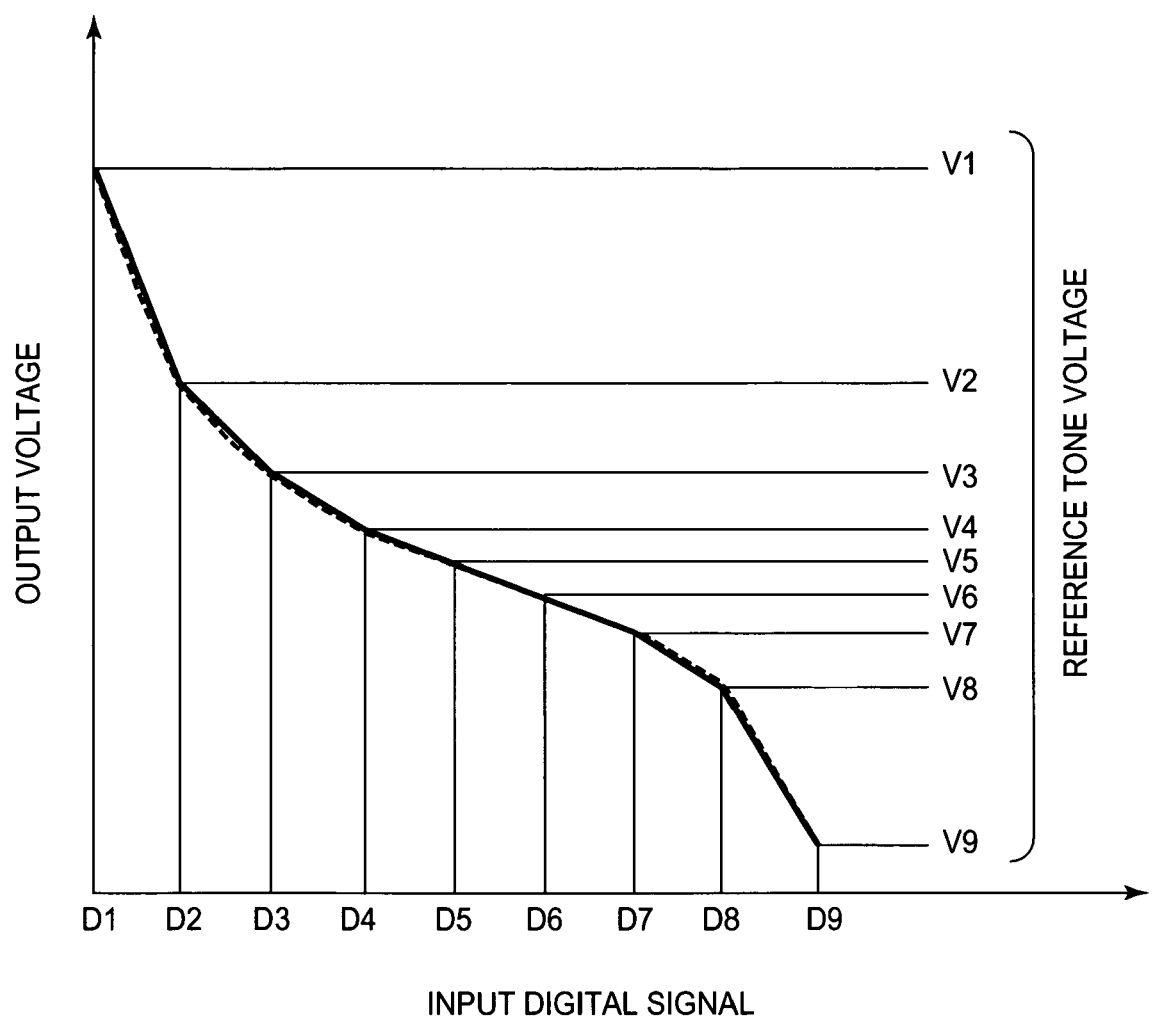
FIG. 19 is a diagram illustrating a relationship between input-output voltage to a DAC in a source driver-signal generator and output voltage from a reference tone signal generator.

The reference tone voltage generator 7 outputs the desired reference tone voltages V1 to V9 corresponding to the input index number signal and sends these voltages to the DAC in the source driver, control signal generator 34. In this DAC, the output voltages when D1 to D9 which are reference tone values of the mantissa signal as the input digital signal are respectively inputted are set the reference tone voltages V1 to V9. Namely, when the input mantissa signal is D1, V1 is outputted as the output of the DAC, and when the input mantissa signal is D2, V2 is outputted. If D1<D2< ... <D9 is assumed, when the tone between D1 and D2 is inputted to the DAC, a voltage which has been determined by the linear interpolation of two reference tone voltages V1 and V2 sandwiching such tone is outputted. The input-output characteristic of this DAC is illustrated in FIG. 19. A broken line indicates the desired input-output characteristic (input-output characteristic adapted to the gamma characteristic of the liquid crystal display 12), while a solid line indicates the input-output characteristic of the DAC. As illustrated in the figure, the input-output characteristic of DAC is approximated to the characteristic obtained using a plurality of segments from the desired input-output characteristic. This input-output characteristic can be determined uniquely when the display apparatus is determined.

Figure 20:
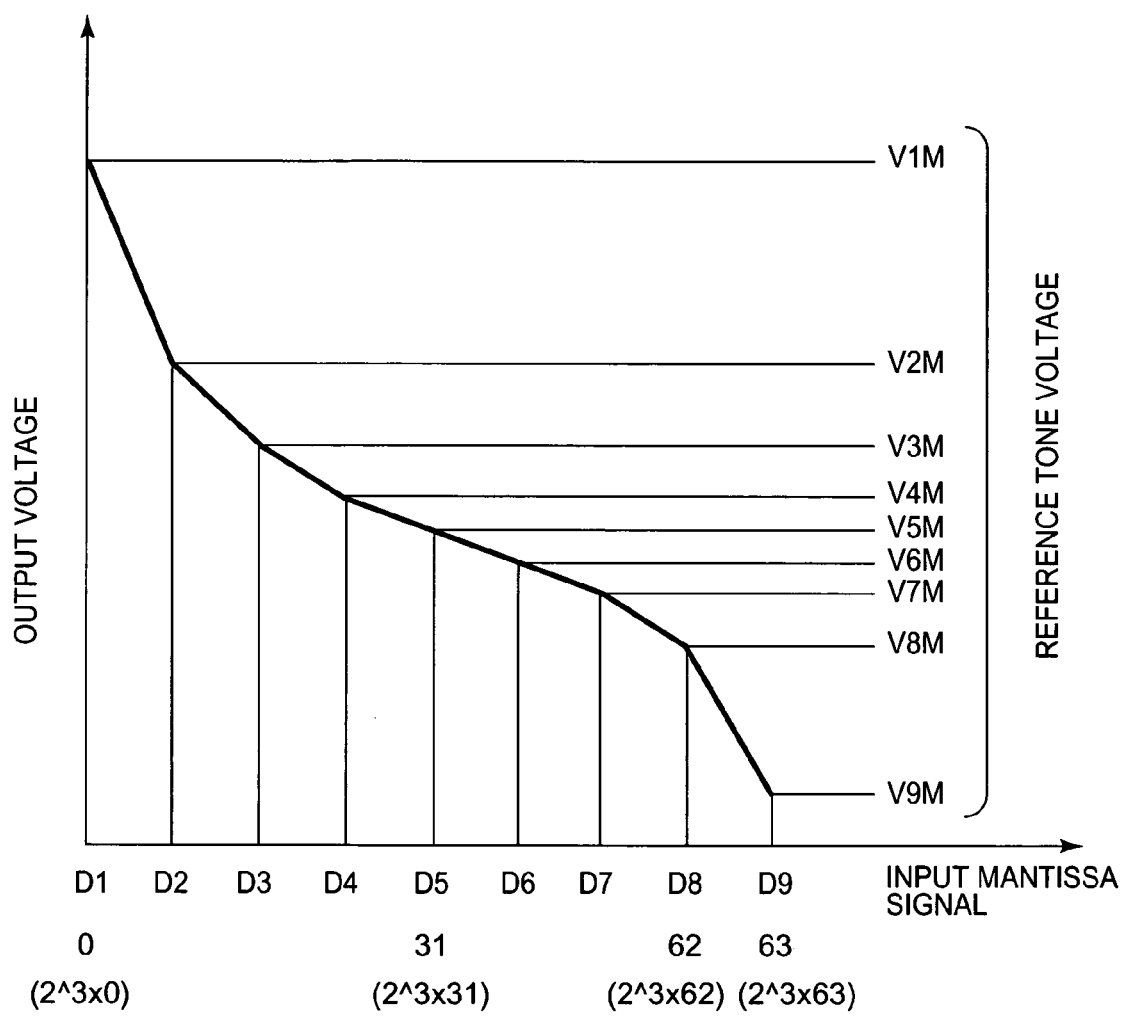
FIG. 20 is a diagram illustrating a relationship between input-output voltage to the DAC in the source driver-signal generator and output voltage from the reference tone signal generator when Tn is 3("11").
Figure 21:
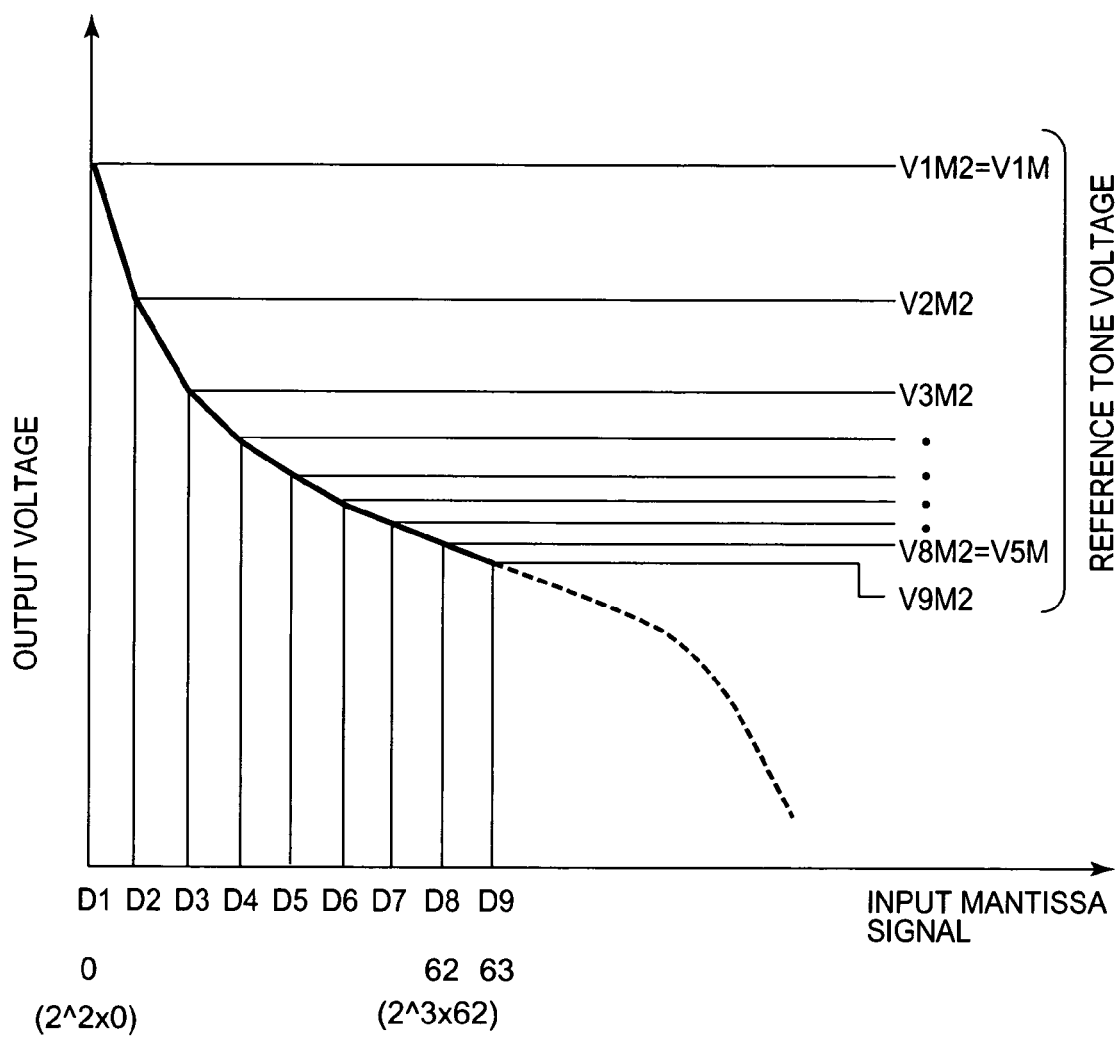
FIG. 21 is a diagram illustrating a relationship between input-output voltage to the DAC in the source driver-signal generator and output voltage from the reference tone signal generator when Tn is 2("10").

Here, a method for determining the reference tone voltage in the reference tone voltage generator 7 will be explained. The reference tone voltage generator 7 is capable of generating sets of the reference tone voltages V1 to V9 as many as the number of values which the input index number signal can take. For example, when the index number signal is two (2) bits, four ($=2^2$) sets of the voltage of V1 to V9 can be generated. An example will be explained with reference to FIG. 20 and FIG. 21.

For example, the index number signal Tn and the mantissa signal Tm as the output values of the selector 6 in FIG. 18 are assumed as two (2) bits and six (6) bits (index number is two (2) bits and mantissa is six (6) bits) and the tone value is expressed as $2^{Tn} \times Tm$ (namely, A=2). Moreover, when Tn="11(3 of decimal number)" is set up, a set of the reference tone voltages generated by the reference tone voltage generator 7 is assumed as V1M, V2M, ..., V9M. The mantissa signal value corresponding to this voltage value is assumed to be D1M, D2M, ..., D9M, while following is also assumed that D1M="000000", D5M="011111", D8M="111110", and D9M="111111". In this case, the tone value corresponding to the output voltage of V5M becomes $2^{Tn} \times D5M = 2^3 \times 31 = 248$ (refer to FIG. 20).

Here, when Tn="10(2 in the decimal number)", sets of the reference tone voltages V1M2, V2M2, ..., V9M2 are set as follows. For example, since a tone value corresponding to V1M2 is $2^{Tn} \times D1M = 2^2 \times 0 = 0$, V1M2=V1M (because $2^3 \times 0 = 0$) can be obtained. Moreover, since a tone value corresponding to V8M2 is $2^{Tn} \times D8M = 2^2 \times 62 = 248$, V8M2=V5M (because $2^3 \times 31 = 248$) can be obtained (refer to FIG. 21). As explained above, based on the V1M to V9M which have been obtained when Tn="11", V1 to V9 when Tn has the other value are set. In other words, first the reference tone signal when the Tn takes the maximum value is obtained and the reference tone signal is then obtained, on the basis of such reference tone signal, when the Tn takes the value other than the maximum value.

In above example, the nine reference tone values (D1 to D9) of the mantissa signal are considered. However, the number of reference tone values of the mantissa signal is never limited thereto.

In FIG. 19, D1 is required to take the minimum value of the mantissa signal, while D9, to take the maximum value of the mantissa signal in order to convert all mantissa signals in accordance with the characteristic of the positive gamma correction. Moreover, as the linear interpolation method, it is considered to obtain a partial resistance voltage with a resistance string.

As will be apparent from above explanation, the voltage after conversion in the DAC is determined with an output (reference tone voltage) from the reference tone signal generator 7.

Here, the process up to display of image on the liquid crystal display 12 from input of the digital image signal to the image processor 1 will be explained. In the DAC, the signal outputted from the image processor 1 is subjected to the DA conversion on the basis of the impression voltage-luminance characteristic of the pixel 35 of the liquid crystal display 12 and the conversion characteristic obtained from the gamma characteristic of the input image signal.

The reference tone voltages V1 to V9 to realize conversion with the DAC are generated by the reference tone signal generator 7 and are then outputted to the DAC. Here, the reference tone voltages V1 to V9 are set with the conversion characteristic and the index number signal. The signal converted to the analog signal in the DAC is then applied to the pixel 35 via the source driver, control signal generator 34 and TFT 37. This analog signal is converted to the luminance signal and is then produced an image.

In more practical, the index number signal of the output from the selector 6 is sent to the reference tone signal generator 7 as illustrated in FIG. 18. The reference tone signal generator 7 receives the index number signal, generates the reference voltage which provides 2^(index number signal) times of the tone of the input signal, and then outputs such reference voltage to the DAC. Since the reference tone signal which provides 2(index number signal) times of the tone of the input signal is generated from the reference tone signal generator 7, although the mantissa signal is inputted to the DAC, the output analog signal becomes 2^(index number signal)×(mantissa signal) and is then outputted.

With the structure explained above, the positive gamma correction can be realized with the reference tone signal generator 7 and the DAC without digital synthesizing of the signal divided to the index number and the mantissa. Moreover, it is proved that conversion is conducted with higher accuracy through modulation of the reference tone signal using the index number while the accuracy of DAC is maintained at six (6) bits.

With the structure explained above, highly accurate operation can be executed, as in the case of each embodiment explained above, by dividing the tone signal into the index number and the mantissa.

Moreover, the circuit scale of the image processing apparatus and display apparatus can be reduced by applying this digital gamma correction circuit.

Each embodiment explained above is an example of the preferred embodiments of the present invention and the present invention is never limited thereto. For example, in each embodiment, the liquid crystal display apparatus has mainly been explained, but the present invention is never limited thereto and moreover the present invention can also be adapted to the display apparatus using PDP and organic EL.

Moreover, the image processor 1 has been formed as a circuit in each embodiment explained above, but it is also possible to use a computer as the image processor 1 through the software process. In this case, the inverse gamma corrector and the positive gamma corrector are formed within the operation apparatus (CPU or the like) which has executed the inverse gamma correction program and positive gamma program in order to execute the process similar to that in each embodiment. Both inverse gamma correction and positive gamma correction can naturally be realized with the software process and any of these corrections can be realized with the software process. In addition, it is also possible to execute these processes with the software process including the process (color space conversion process, brightness-contrast correction process or the like) to be done between the inverse gamma correction and the positive gamma correction.

Moreover, it is also possible to combine the structures in relation to each embodiment within the possible range. As explained above, the present invention allows various modifications.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is the inventor's intent to retain all equivalents of the claimed invention even if the claims are amended during prosecution.

What is claimed is:

1. A gamma correction method, comprising:
    inputting via a computer a value of a tone input signal Tin of X bits having non-linear tone-luminance characteristic;
    outputting via the computer a tone signal Tout of Y bits (X<Y) having the tone-luminance characteristic converted to a linear characteristic, producing an inverse gamma correction; and
    inputting via the computer said Tout and outputting the tone output signal of (N+M) bits formed of a set of Tn and Tm which is nearest to said Tout upon said Tout being expressed as A^Tn×Tm with a constant A, an index number indicated by the signal Tn of N bits and a mantissa indicated by the signal Tm of M bits, producing a format conversion;
    wherein A is a natural number power of 2,
    M satisfies the relationship M≦Y−N,
    the minimum value of N is 2 when A is 2 and 1 when A is larger than 2, and
    the maximum value of N which is determined on the basis of A and M is the maximum value resulting in that a set of the values of Tn and Tm becomes a set of different values for all values of Tin.

2. The gamma correction method according to claim 1, wherein Tn has a predetermined value encoded to element of sequence consisting of N integers, equal to or larger than 0, which are increasing from an initial value with non-equal differences.

3. The gamma correction method according to claim 1, wherein inputting the value of said Tin and outputting the value of said Tout is previously determined, under the condition that a value of Tout after bit reduction of the less significant Z bits is set to Tz, only the values where the most significant bits has the value 1 among the values of Tz obtained for all values of Tout are extracted, and the maximum value among the values of Z resulting in different values of all extracted values of Tz is set to Z', A=2, M=Y−Z', and N is set to the minimum integer value which is equal to or larger than 1+log Z'/log 2.

4. The gamma correction method according to claim 1, wherein the inverse gamma correction and said format conversion are executed with only one lookup table.

5. A gamma correction method, comprising:
receiving via a computer a signal of (N+M) bits comprising of a signal Tn of N-bits and a signal Tm of M bits and outputting a tone signal Tout of Y bits having a linear tone-luminance characteristic expressed as Tout=$A^{Tn}$× Tm with a constant A and with an index number of N bits indicated Tn and a mantissa of M bits indicated with Tm, producing a format conversion; and
receiving via a computer a value of Tout and outputting a tone signal Tin of X bits (X<Y) converted non-linearly in a tone-luminance characteristic, producing a gamma correction process,
wherein A is a natural number power of 2,
M satisfies the relationship of M≦Y−N,
the minimum value of said N is 2 when A is 2 and 1 when A is larger than 2, and
the maximum value of N determined on the basis of A and M is the maximum value resulting in that a set of the values of Tn and Tm becomes a set of different values for all values of Tin.

6. An image processing method comprising:
executing a color space conversion process following gamma correction according to claim 1.

7. An image processing method comprising:
executing a brightness-contrast correction process following the gamma correction method according to claim 1.

8. A gamma correction circuit comprising:
circuitry receiving a value of a tone input signal Tin of X bits having nonlinear tone-luminance characteristic and outputting a tone signal Tout of Y bits (X<Y) having the tone-luminance characteristic converted to the linear characteristic, producing an inverse gamma correction; and
circuitry receiving said Tout and outputting the tone output signal of (N+M) bits formed of a set of Tn and Tm which is nearest to said Tout upon said Tout being expressed as $A^{Tn}$×Tm with a constant A, an index number indicated by the signal Tn of N bits and a mantissa indicated by the signal Tm of M bits, producing a format conversion;
wherein A is a natural number power of 2,
M satisfies the relationship of M≦Y−N,
the minimum value of N is 2 when A is 2 and 1 when A is larger than 2, and
the maximum value of N which is determined on the basis of A and M is the maximum value resulting in that a set of the values of Tn and Tm becomes a set of different values for all values of Tin.

9. The gamma correction circuit according to claim 8, further comprising means for encoding said Tn to element a sequence consisting of N integers, equal to or larger than 0, which are increasing from the initial item with non-equal differences.

10. The gamma correction circuit according to claim 8, wherein upon receiving the value of said Tin and outputting the value of said Tout being previously determined, under the condition that a value of Tout after bit reduction of the less significant Z bits is set to Tz, only the values where the most significant bits has the value 1 among the values of Tz obtained for all values of Tout are extracted, and the maximum value among the values of Z resulting in different values of all extracted values of Tz is set to Z',
A=2, M=Y−Z', and N is set to the minimum integer value which is equal to or larger than 1+log Z'/log 2.

11. The gamma correction circuit according to claim 8, wherein said tone output is inputted to at least any of an adder circuit, multiplier circuit, and lookup table circuit.

12. The gamma correction circuit according to claim 11, wherein said tone output is inputted to a circuit executing a color space conversion process on the basis of chromaticity characteristic of a display apparatus.

13. The gamma correction circuit according to claim 11, wherein said tone output is inputted to a circuit executing a brightness-contrast conversion process on the basis of a brightness-contrast characteristic of a display apparatus.

14. A gamma correction circuit comprising:
a format conversion circuit receiving, as an input signal, a signal of (N+M) bits comprised of a signal Tn of N bits and a signal Tm of M bits and outputting a tone signal Tout of Y bits having a linear tone-luminance characteristic expressed as Tout=A^Tn×Tm with a constant A and with an index number of N bits indicated by said Tn and a mantissa of M bits indicated by said Tm; and
a gamma correction circuit receiving a value of said Tout and outputting a tone signal Tin of X bits (X<Y) converted non-linearly in the tone-luminance characteristic,
wherein a value of said constant A is a natural number power of 2,
said M satisfies the relationship of M≦Y−N,
the minimum value of said N is 2 when A is 2 and 1 when A is larger than 2, and
the maximum value of said N determined on the basis of said constant A and said M is the maximum value resulting in that a set of the values of Tn and Tm becomes a set of different values for all values of Tin.

15. The gamma correction circuit according to claim 14, wherein said gamma correction circuit and said format conversion circuit are realized with only one lookup table.

16. An image processing apparatus comprising the gamma correction circuit according to claim 8.

17. An image processing apparatus for outputting an analog voltage to determine tone of a display apparatus, comprising:
a DA converter performing DA conversion of an input signal of M bits among input signals comprising signals of N bits and the signal of M bits; and
a reference voltage generator outputting a reference voltage for DA conversion in said DA converter,
wherein an index number Tn indicated with said signal of N bits and a mantissa Tm indicated with said signal of M bits are provided for expressing a tone signal Tout of Y bits having linear tone-luminance characteristic as Tout=$A^{Tn}$×Tm using a constant A,
the value of said A is a natural number power of 2, and
said reference voltage generator generates said reference voltage on the basis of said signal of N bits.

18. A display apparatus comprising:
display means; and
the image processing apparatus according to claim 16.

19. The display apparatus according to claim 18, wherein said display means is a liquid crystal display.

* * * * *

UNITED STATES PATENT AND TRADEMARK OFFICE
CERTIFICATE OF CORRECTION

PATENT NO.      : 7,663,678 B2                                              Page 1 of 1
APPLICATION NO. : 11/232926
DATED           : February 16, 2010
INVENTOR(S)     : Daigo Miyasaka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this

Fourth Day of January, 2011

David J. Kappos
*Director of the United States Patent and Trademark Office*